United States Patent [19]
Lipniarski

[11] Patent Number: 6,102,156
[45] Date of Patent: Aug. 15, 2000

[54] BLOW MOLDED ARTICLES AND METHOD OF MAKING

[75] Inventor: David J. Lipniarski, North Tonawanda, N.Y.

[73] Assignee: Confer Plastics, Inc., North Tonawanda, N.Y.

[21] Appl. No.: 09/115,046

[22] Filed: Jul. 14, 1998

Related U.S. Application Data

[60] Provisional application No. 60/052,483, Jul. 14, 1997.

[51] Int. Cl.[7] ....................................................... E06C 7/16
[52] U.S. Cl. .............................. 182/118; 182/115; 49/381
[58] Field of Search ................................ 49/381; 16/257, 16/260, 222, 225, 303, 312, 314, 315, 317; 425/525; 211/189; 182/118, 152

[56] References Cited

U.S. PATENT DOCUMENTS

| | | | |
|---|---|---|---|
| 2,871,914 | 2/1959 | Timoney | 155/22 |
| 3,724,595 | 4/1973 | Green | 182/118 |
| 3,908,795 | 9/1975 | Gannon | 182/118 |
| 4,004,652 | 1/1977 | Laboy-Alvarado | 182/118 |
| 4,023,647 | 5/1977 | Confer | 182/118 |
| 4,067,614 | 1/1978 | Confer | 297/438 |
| 4,166,833 | 9/1979 | Schurman | 264/540 |
| 4,997,061 | 3/1991 | Aymes | 182/106 |
| 5,012,614 | 5/1991 | Shea | 49/468 |
| 5,044,465 | 9/1991 | Rinke | 182/97 |
| 5,133,152 | 7/1992 | Grancagnolo | 49/239 |
| 5,244,291 | 9/1993 | Confer | 403/374 |
| 5,361,456 | 11/1994 | Newby, Sr. | 16/257 |
| 5,641,035 | 6/1997 | Pettit | 182/86 |
| 5,715,907 | 2/1998 | Andret et al. | 182/118 |

*Primary Examiner*—Daniel P. Stodola
*Assistant Examiner*—Curtis A. Cohen
*Attorney, Agent, or Firm*—Hodgson Russ Andrews Woods & Goodyear LLP

[57] ABSTRACT

A gate hingedly connected to a staircase. The gate hinge is blow-molded integrally with the gate body. A mounting post has on one portion a hinge pin for receiving the gate hinge, and the other portion has a pair of parallel resilient sheets for receiving an edge portion of the staircase. Two staircases are attached back-to-back by vertical flanges each of which is offset from a vertical center plane of the respective back wall portion and has a vertical surface which is co-planar with the vertical center plane. The corners of the staircase are individually height adjustable by internally threaded portions which receive threaded rods. The internal threads are formed as part of the blow-molding process. A hole to the interior of the staircase or other article is formed as part of the blow-molding process.

2 Claims, 15 Drawing Sheets

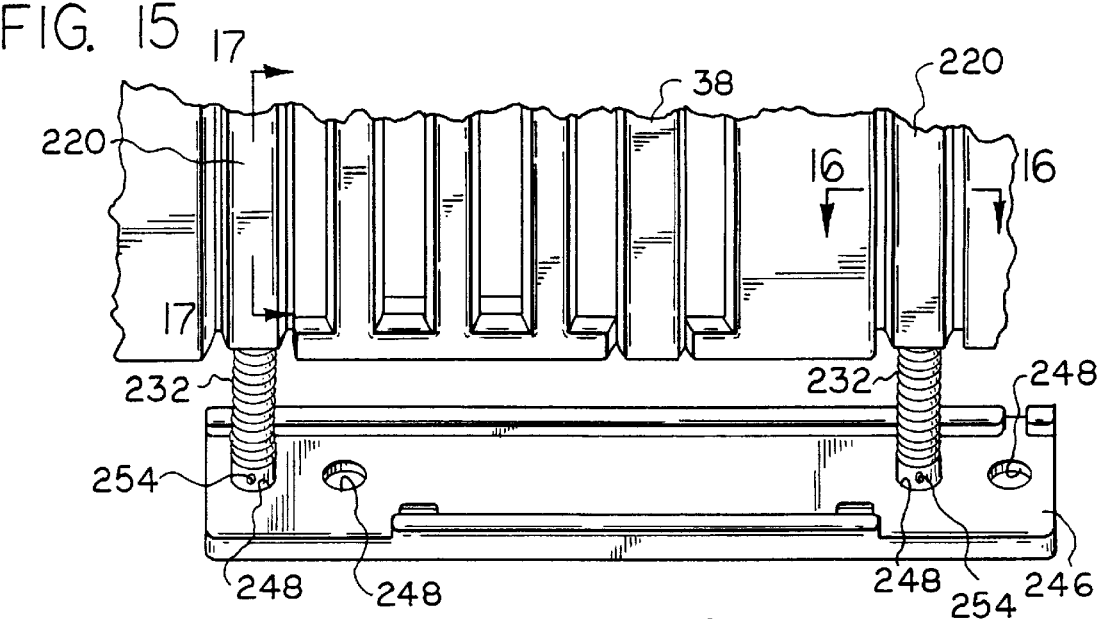
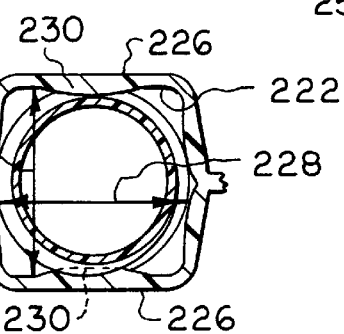
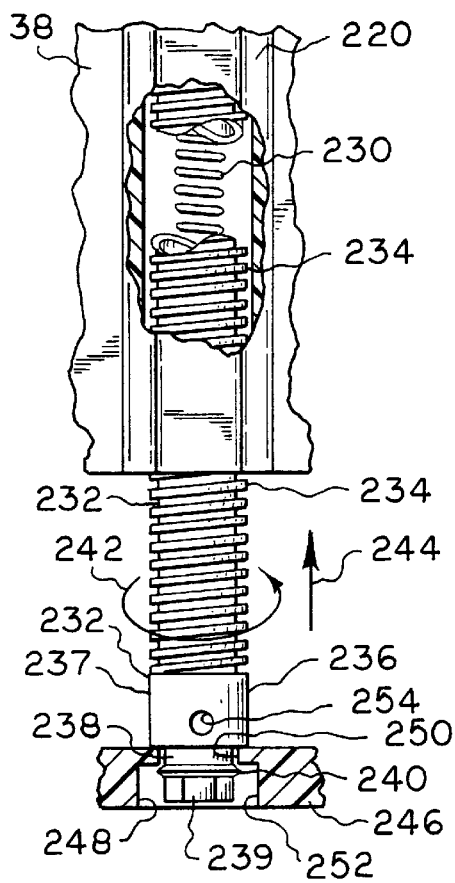
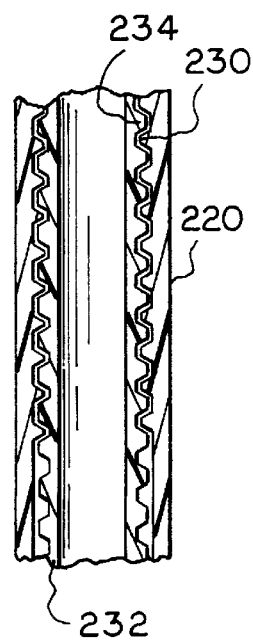

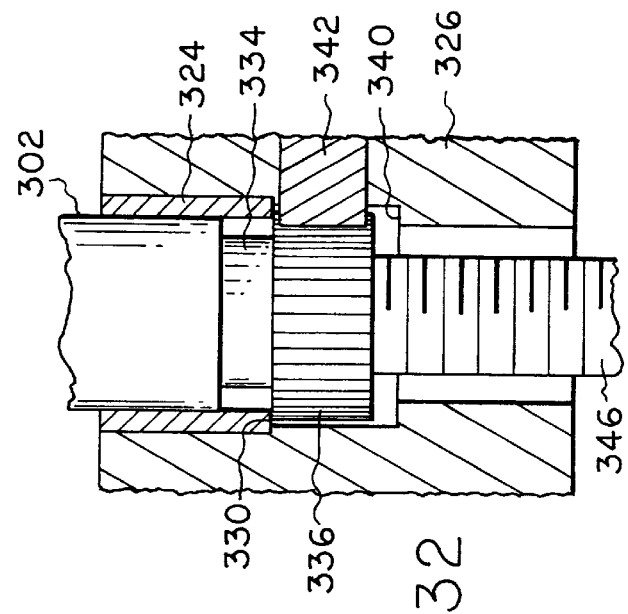
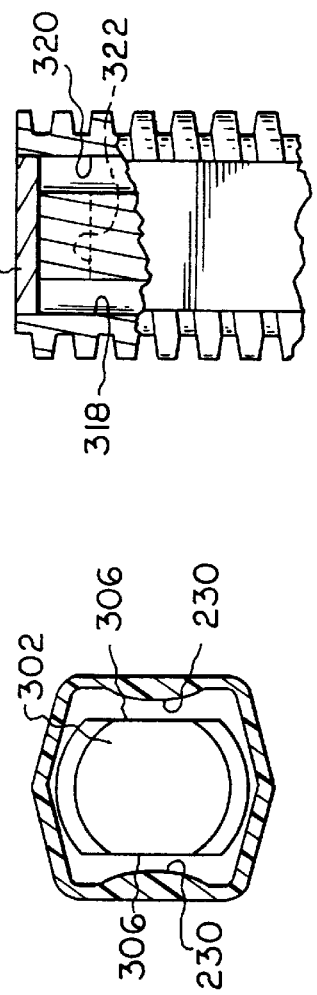
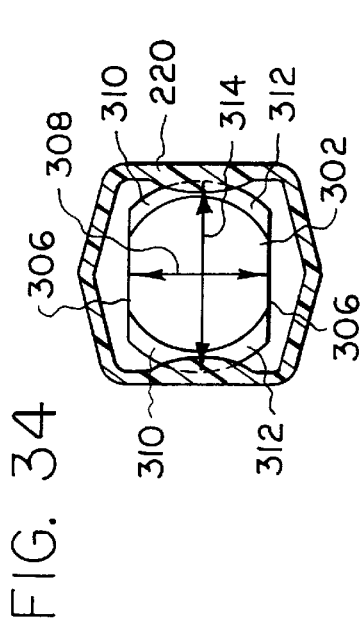
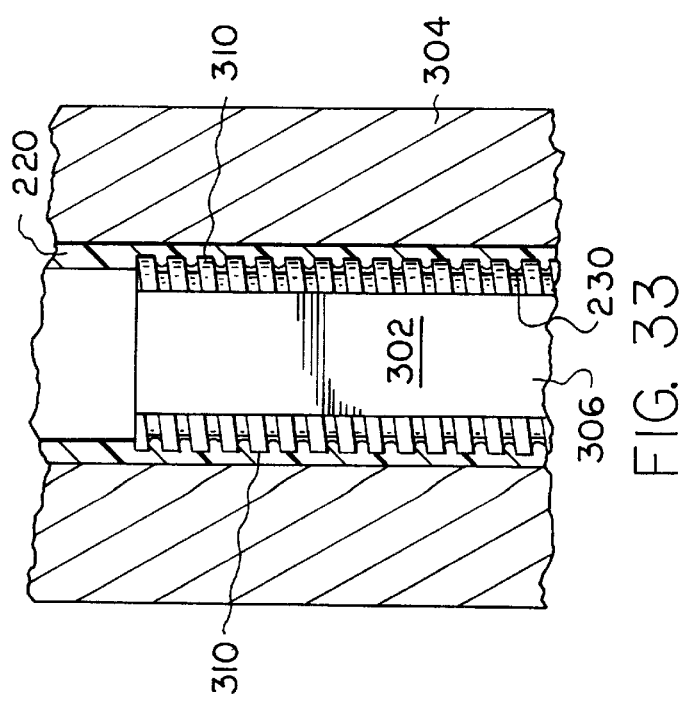

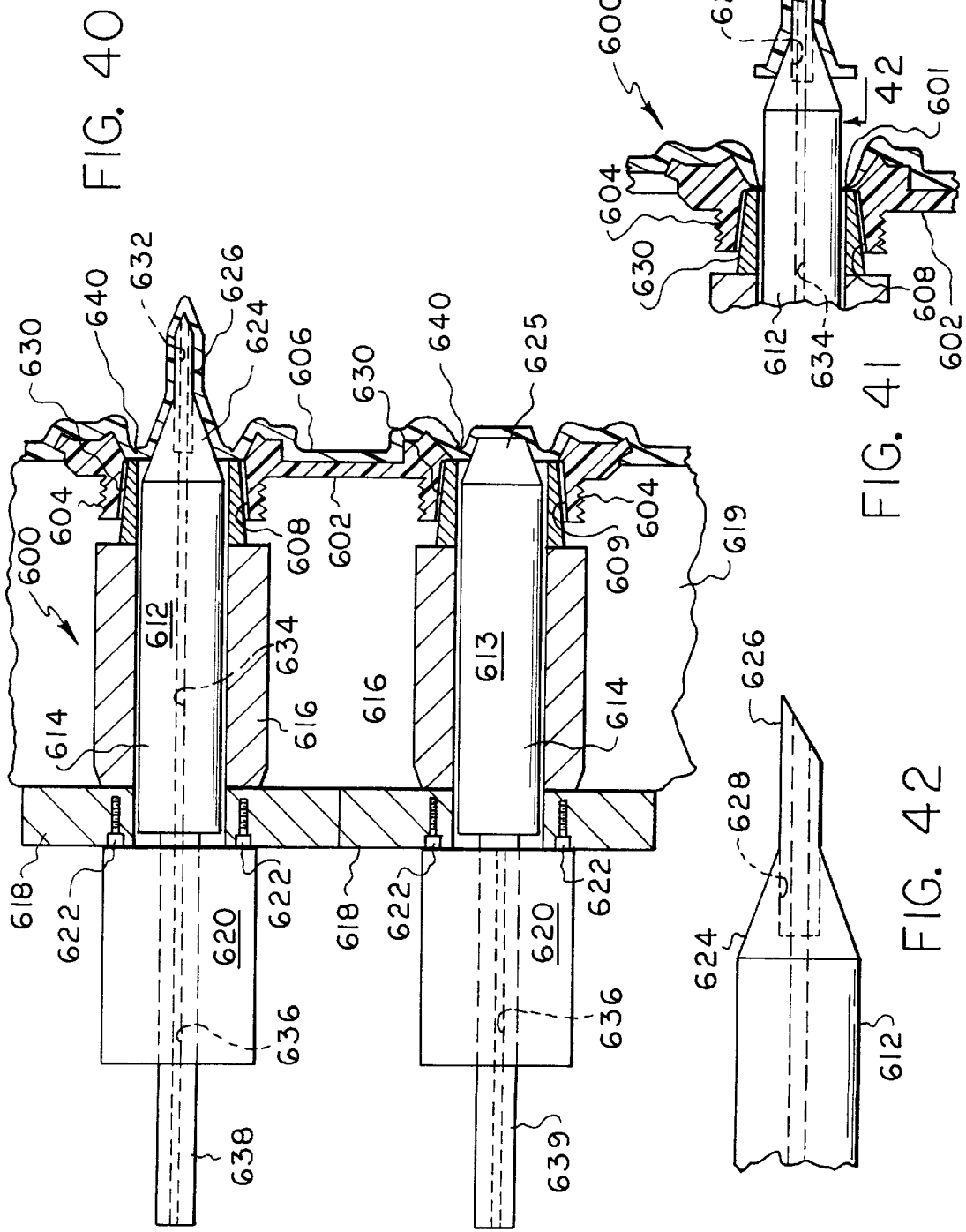

BLOW MOLDED ARTICLES AND METHOD OF MAKING

Priority of U.S. provisional application Ser. No. 60/052,483, filed Jul. 14, 1997, which is hereby incorporated herein by reference, is hereby claimed.

The present invention relates generally to molded articles which may be blow molded such as a blow-molded ladder or a blow-molded staircase and gate for a swimming pool.

Swimming pool ladders or staircases and various other articles have been made from a plastic material by a process known as "blow-molding," as exemplified by U.S. Pat. No. 4,023,647 to Confer, U.S. Pat. No. 4,067,614 to Confer et al, and U.S. Pat. No. 4,166,833 to Schurman, all of which patents are hereby incorporated herein by reference. In the process of blow molding, a hollow thin-walled structure is formed.

U.S. Pat. No. 5,244,291 to Confer, which is assigned to the assignee of the present invention and which is also incorporated herein by reference, discloses a method of attachment of such structural members. Thus, the steps and risers of swimming pool staircases are, in accordance with this method, attached to the handrail members by means of bosses thereon which are insertable into cavities in the handrails members in an interlocking relationship which is more particularly described in the patent.

It is considered to be a desirable feature of swimming pool staircases that they be fitted with gates to restrict access. When metal gate hinges are screwed to the plastic gate and the plastic mounting post, they may tend to easily rip out of the plastic at the mounting screw area. In addition to the increased cost added to the product, the metal hinges may rust or corrode especially from the pool chemicals. It is thus considered desirable to provide a stronger yet inexpensive and non-corrosive hinge system for attaching a blow-molded gate to a blow-molded swimming pool staircase as well as for attaching other gates to other articles. It is also considered desirable that the gate be self-closing and self-latching and that it be capable of withstanding the forces of children hanging thereon. Furthermore, it is considered desirable to provide mounting posts for the gate which are inexpensive and easy to install yet sturdy when installed.

Swimming pool entry systems have been provided which are adjusted for height by means of a base which extends up and down on a slide and is secured at defined locations by screw positioning holes. Such a design cannot be adapted to irregular terrain without first leveling the surface on which the base rests. It is considered desirable to be able to level the staircase no matter what the ground configuration is.

It is also considered desirable to mount two identical staircases back-to-back as a free-standing unit.

It is moreover considered desirable to inexpensively provide holes into the interior of a blow-molded article as part of the blow molding process rather than to bear the added expense of forming the holes separately such as by drilling after the article has been blow molded.

It is furthermore considered desirable to provide as part of the blow molding process (instead of as a separate operation after an article is blow molded) a passage to the interior of the article which has a threaded connection with high quality threads.

It is accordingly an object of the present invention to provide a strong yet inexpensive and non-corrosive hinge system for blow-molded and other plastic articles.

It is another object of the present invention to provide such a hinge system wherein the gate is self-closing.

It is a further object of the present invention to provide such a hinge system wherein the gate is self-latching and capable of withstanding forces of children hanging thereon.

It is yet another object of the present invention to provide inexpensive, easy-to-install, and sturdy mounting posts for the gate.

It is still another object of the present invention to be able to level the staircase no matter what the ground configuration is.

It is another object of the present invention to be able to mount two identical staircases back-to-back as a free-standing unit.

It is a further object of the present invention to mold internal threads for staircase levelers or other purposes as part of the blow molding process instead of incurring the added expense of performing this operation separately after the article is blow-molded.

It is yet another object of the present invention to mold holes into the interior of a blow molded article as part of the blow molding process instead of incurring the added expense of performing this operation separately after the article is blow-molded.

It is still another object of the present invention to provide a passage to the interior of a blow molded article which has a threaded connection with high quality threads as part of the blow molding process (instead of as a separate operation after an article is blow molded).

In accordance with the present invention, a gate is provided wherein the hinges are molded as integral parts thereof so that the hinges are durably attached and provided inexpensively. The bearing surfaces on which the gate swings are helically shaped downwardly to effect self-closing of the gate, and means are provided for self-latching the gate. The gate has a protruding portion on its latch side to be received in a notch in the corresponding mounting post (for a staircase or the like) for support of children hanging on the gate. The mounting posts are molded to have jaws which may be spread apart to receive and close on edge portions of corresponding staircase members, and the jaws are urged tightly together by screws or other fastening means.

Further in accordance with the present invention, the staircase has a plurality of independent rods which are threadedly receivable in bottom members thereof for height adjustment independently of each other so that the staircase can be easily leveled.

Also in accordance with the present invention, each staircase is molded to have vertical flanges or strips along back edges thereof which mate with and are attached to the flanges of another such staircase so that two identical staircases may be attached back-to-back to be free-standing. Each flange is offset from the centerplane of the corresponding back edge and has a surface which is co-planar with the centerplane so that the flanges may mate with each other for attachment.

In order to form internal threads as part of the blow molding process, in accordance with the present invention, a threaded rod portion which has a pair of diametrically opposed threaded sides having a major diameter and a pair of diametrically opposed truncated sides having a minor diameter which is less than the major diameter is extended into position to form internal threads as part of the blow molding process. After the article has been formed, the rod is rotated about 90 degrees while being retracted at a rate corresponding to the pitch of the threads and thereafter retracted without turning to remove the rod from the formed article.

In order to form a hole into the interior of a blow-molded article as part of the blow molding process, in accordance with the present invention, an opening is provided in the mold wall, a punch is positioned so that its end portion having a cutting edge is received in the mold wall opening to effect a line of weakness as the article is blow molded with the cutting edge protruding into the mold cavity, and the cutting edge is moved further into the mold cavity to cut the blow-molded material along the line of weakness after the blow-molded material has been applied to the mold wall.

In order to form a passage having a high quality threaded connection into the interior of a blow-molded article as part of the blow molding process, in accordance with the present invention, an insert having at least one hole and a threaded connection is mounted on an interior surface of a blow-mold wall in alignment with an opening in the wall, a punch is positioned so that its end portion is received in the mold wall opening to effect a line of weakness as the article is blow molded with the end portion protruding into the mold cavity, and the end portion is moved further into the mold cavity to sever the blow-molded material along the line of weakness after the blow-molded material has been applied to the mold wall.

The above and other objects, features, and advantages of the present invention will be apparent in the following detailed description of a preferred embodiment thereof when read in conjunction with the accompanying drawings wherein the same reference numerals denote the same or similar parts throughout the several views.

BRIEF DESCRIPTION OF THE DRAWINGS

FIG. 15 is an enlarged partial elevation view of one of the staircases including a height adjusting means therefor.

FIG. 16 is a sectional view taken along lines 16—16 of FIG. 15.

FIG. 17 is a sectional view taken along lines 17—17 of FIG. 15.

FIG. 18 is an enlarged partial side elevational view, partly in section and with portions broken away, or a portion of the height adjusting means.

FIG. 28 is an enlarged elevation view of a portion thereof taken along lines 28—28 of FIG. 26 and illustrating the thread mold portion.

FIG. 29 is a view similar to that of FIG. 28 and also taken along lines 28—28 of FIG. 26 with the thread mold portion rotated 90 degrees.

FIG. 30 is a sectional view taken along lines 30—30 of FIG. 28.

FIG. 31 is a sectional view taken along lines 31—31 of FIG. 28.

FIG. 32 is a sectional view taken along lines 32—32 of FIG. 28.

FIG. 33 is a sectional elevation view of the thread mold portion in position, similarly as illustrated in FIG. 28, for molding internal threads.

FIG. 34 is a top view of the thread mold portion in the position of FIG. 33.

FIG. 35 is a view similar to that of FIG. 34 of the thread mold portion rotated 90 degrees for removal after molding.

FIG. 36 is a partial enlarged elevation view, partly in section, of the thread mold portion.

FIG. 40 is a view similar to that of FIG. 37 of another embodiment of apparatus for forming a pair of holes in a wall during blow molding, illustrating a first stage of hole formation.

FIG. 41 is a partial view similar to that of FIG. 37 of the apparatus of FIG. 40, illustrating a second stage of hole formation.

FIG. 42 is a partial side view of the punch and needle of FIG. 41, taken along lines 42—42 of FIG. 41.

DETAILED DESCRIPTION OF THE PREFERRED EMBODIMENT

Figure 1:
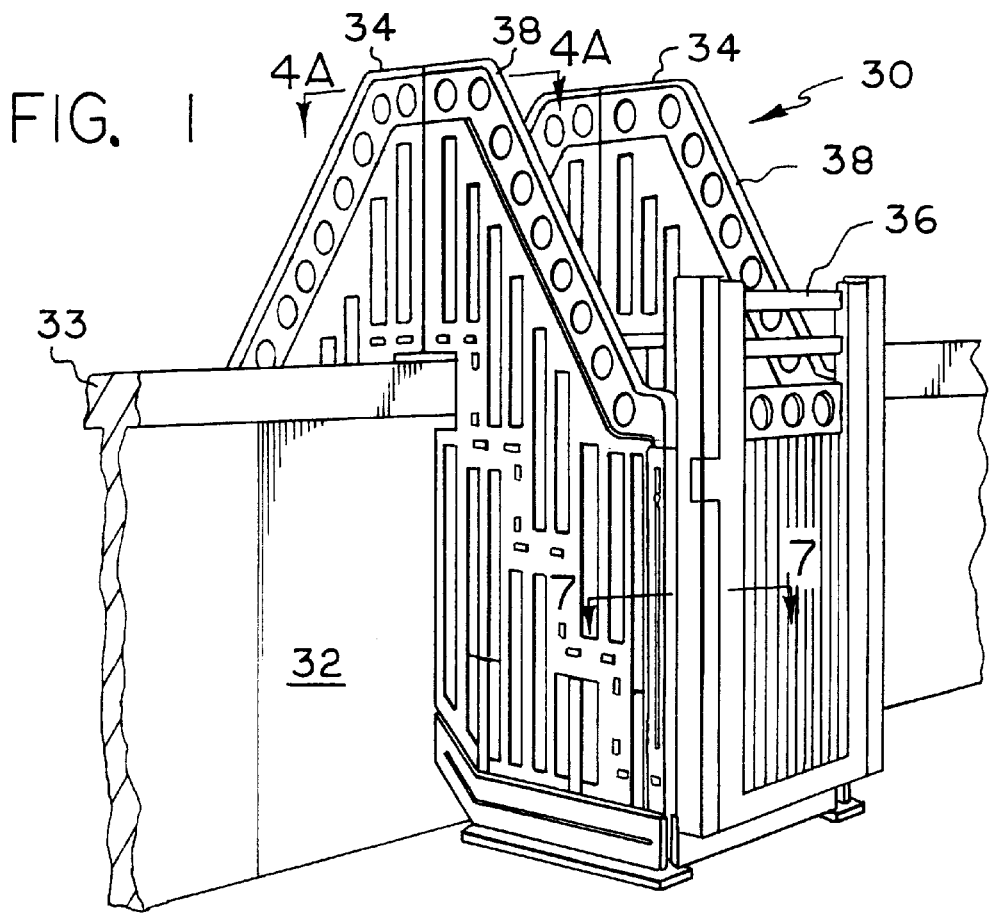
FIG. 1 is a perspective view of a pair of staircases connected back-to-back for an above-ground swimming pool and a gate which embody the present invention.
Figure 7:
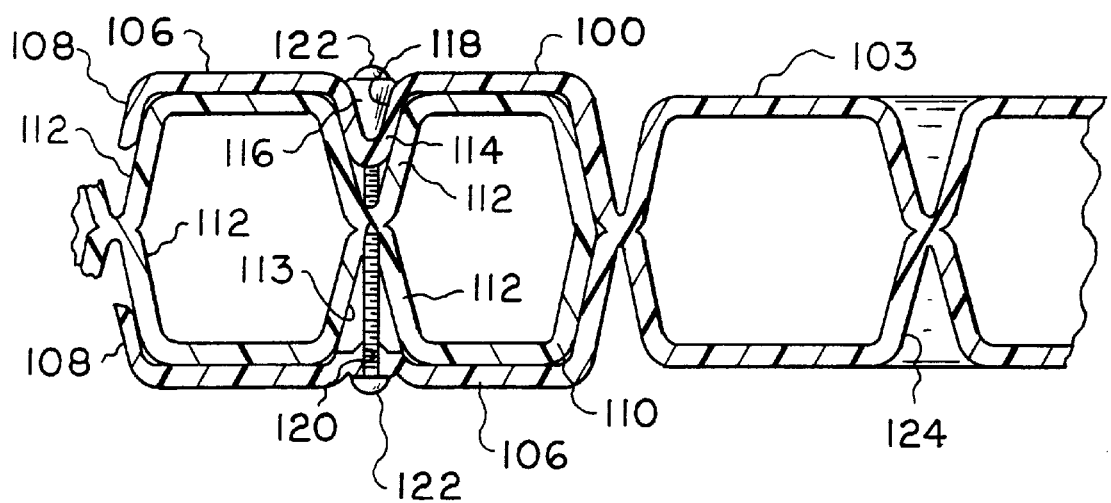
FIG. 7 is a sectional view taken along lines 7—7 of FIG. 1.

Referring to FIG. 1, there is illustrated generally at 30 an entry system for an above-ground swimming pool, a wall for the pool being illustrated at 32. The entry system 30 includes a pair of identical ladders or staircases 34 connected back-to-back, as discussed hereinafter, one for ascending and one for descending to get on the other side of the pool wall 32. The entry system 30 also includes a gate 36 mounted, as hereinafter discussed, at the front or entrance of one of the stairways, i.e., the one to the outside of the pool.

Figure 2:
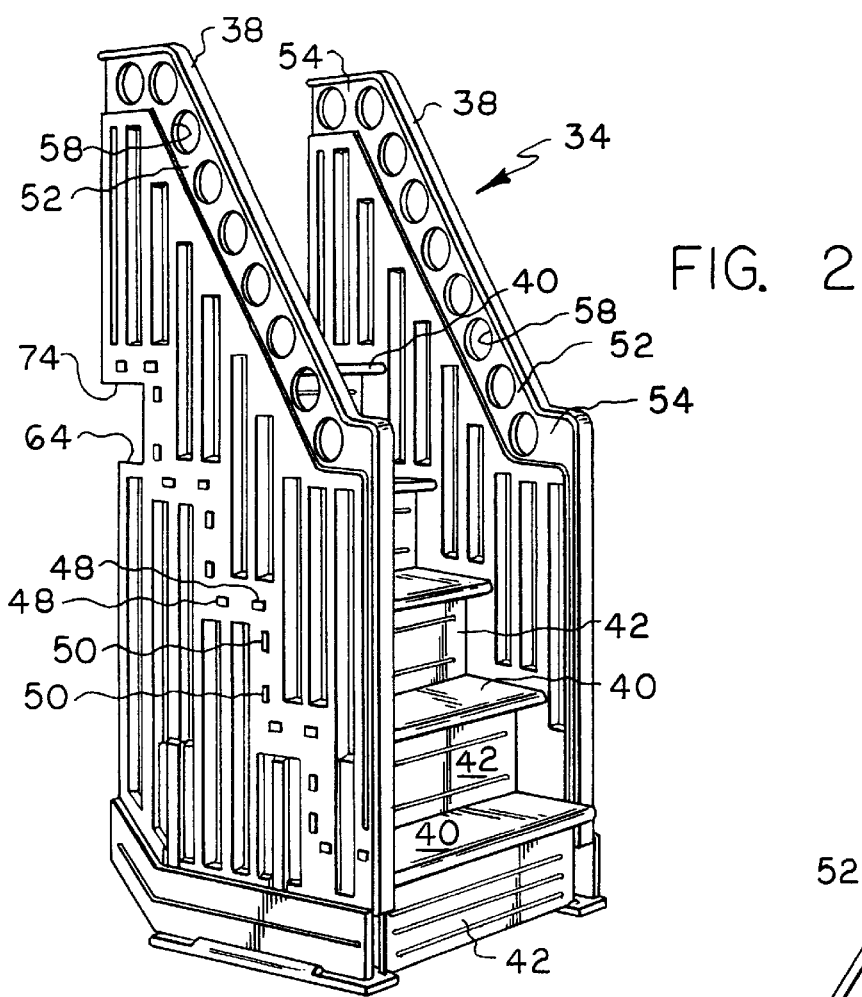
FIG. 2 is a perspective view of one of the staircases.
Figure 3:
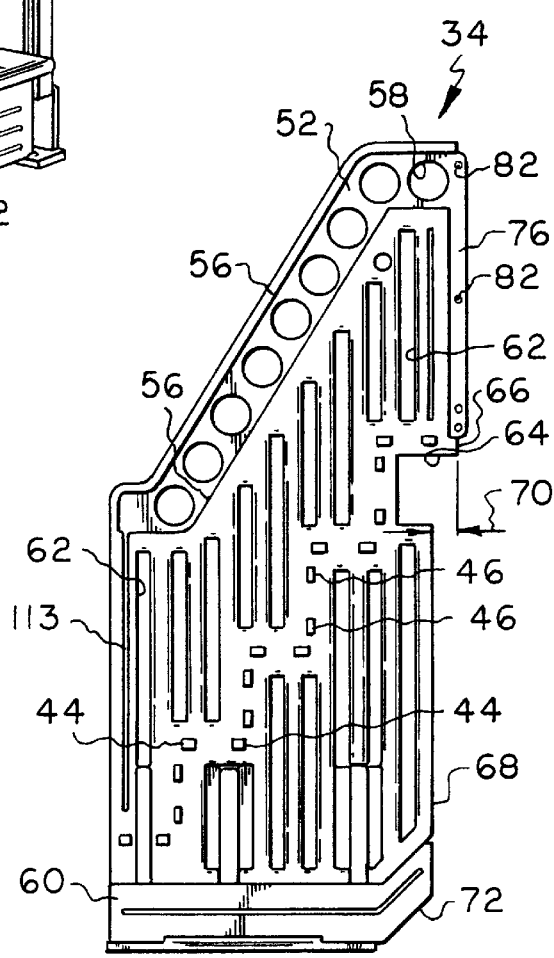
FIG. 3 is a side elevation view of the staircase.

Referring to FIG. 2, each of the staircases 34 includes a pair of identical generally planar parallel vertical structures 38 defining the sides of the staircase and interconnected by a series of alternating horizontal steps 40 preferably having suitable non-slip step surfaces and vertical risers 42. As seen in FIG. 2, the staircase 34 has five steps 40 whereby the steps are spaced closer together than in typical four-step staircases to make it easier to enter and exit the pool.

Each of the staircase side members 38 is blow-molded of plastic, such as, for example, high density polyethylene or other suitable material, in accordance with the aforesaid patents, to have a hollow interior and defining pairs of horizontally spaced rectangular cavities 44 alternating with pairs of vertically spaced rectangular cavities 46. The steps 40 and risers 42 as well as the gate 36 are also blow molded of plastic such as, for example, high density polyethylene or other suitable material. The all-plastic construction will not affect water chemistry and will not corrode. Each end of each of the risers 42 has a pair of rectangular (in cross section) bosses 50 thereon which are received in the corresponding pair of cavities 46 respectively in sidewalls 38 and support the steps 40 over their lengths. As discussed in the aforesaid U.S. Pat. No. 5,244,291, each end of each of the steps 40 has a pair of rectangular (in cross section) bosses 48 thereon which are snapped into the corresponding pair of cavities 44 respectively in sidewalls 38 and suitably interlocked thereto with plastic wedges (not shown), which advantageously have no metal parts to corrode. Further details of attachment of the steps and risers may be found in the aforesaid U.S. Pat. No. 5,244,291.

Each staircase side 38 has an upwardly sloping handrail portion 52 (which parallels the slope of the steps, as is typical for staircases) defining the upper edge thereof. The handrail 52 terminates at each end in a short horizontal portion 54. The handrail 52 is defined by parallel ridges 56 between which are provided a plurality of, for example, nine spaced holes 58 which serve as handholds to pull oneself up out of the water as he or she walks up the stairs or to otherwise pull onself up. Thus, the more closely spaced steps and the handholds allow the stairs to be more easily used by elderly and physically challenged swimmers.

Each staircase side 38 is also molded to have a horizontal bottom portion or skirt 60. Between the handrail 52 and the bottom portion, the staircase side 38 is molded to have a plurality of horizontally spaced generally rectangular elongate vertical cut-outs or openings 62 which are discontinuous near the apertures 44 and 46. These ventilation holes 62 allow water to circulate through the entry system 30 to prevent algae growth.

At about the level of the lower handrail portion 54, a squared notch, illustrated at 64, is formed in the rear or back edge of the staircase side 38. The rear edge of the staircase side 38 has a first portion 66 extending upwardly from the notch 64 and a second portion 68 extending downwardly therefrom. A pair of staircases 34 are mounted back-to-back with corresponding staircase sides 38 attached to each other along their upper edge portions 66, as hereinafter described. The lower edge portion 68 is recessed inwardly a distance, illustrated at 70, so that the thickness of the wall 32 may be received between the attached staircases 34. The notches 64 together receive the cross-sectionally enlarged top portion 33 of the wall 32. The bottom portion 60 slopes upwardly at the rear thereof, as illustrated at 72. However, a single staircase may be provided, for example, from inside of an above-ground pool to a deck therefor or, for another example, from the deck to ground level. The entry system is desirably installed so that it does not rest on or attach to the above-ground pool. It should be understood that a single staircase may also be suitably adapted for an in-ground pool.

The following dimensions and other dimensions contained herein, unless otherwise indicated, are provided for exemplary purposes only and not for purposes of limitation. For example, the overall projection of the entry system into a pool may be about 36 inches, the overall height may be about 81 inches (plus up to about 6 inches adjustability, as hereinafter discussed), and the overall width may be about 31 inches. The top platform may be about 12 inches by 27 inches, the handrail height (from ground level) may be about 45 inches, and the riser height may be about 11 inches. Each step may be about 10 inches by 27 inches.

Figure 4A:
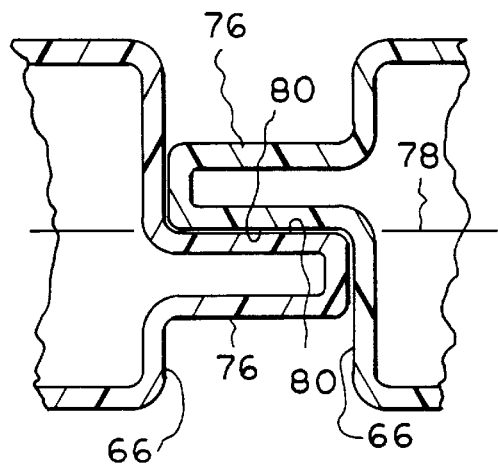
FIG. 4A is a sectional view taken along lines 4A—4A of FIG. 1, and illustrating flange portions for attaching the staircases.
Figure 4B:
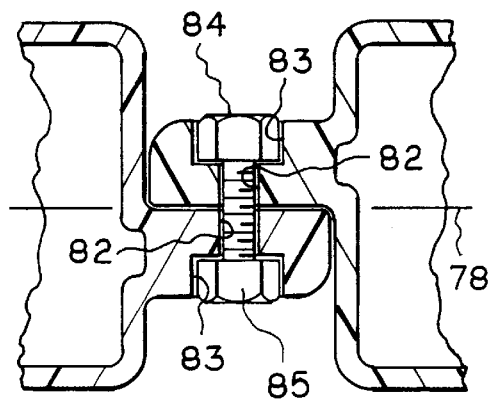
FIG. 4B is a view similar to that of FIG. 4A illustrating attachment of the flange portions together at locations spaced periodically along the lengths thereof.

Each of the staircase sides or handrail members 38 is formed to have an elongate hollow vertical protrusion or flange 76 along the upper edge 66. Referring to FIGS. 4A and 4B, this flange 76 is offset to one side of the centerplane, illustrated at 78, of the handrail member but with one side 80 thereof lying in the centerplane 78. When the staircases 34 are placed back-to-back, the flanges 76 are on opposite sides of the common centerplane 78 and with the sides 80 engaging each other. The flanges 76 are formed to have vertically spaced apertures, illustrated at 82, with counterbores 83, therein. The flanges 76 are connected together by bolts 84, inserted in the corresponding apertures of the flanges 76 of both respective handrail members 34 to be attached, and by nuts 85 or by other suitable fasteners. The heads of the bolts 84 and the nuts 85 are received in the respective counterbores 83.

Figure 4C:
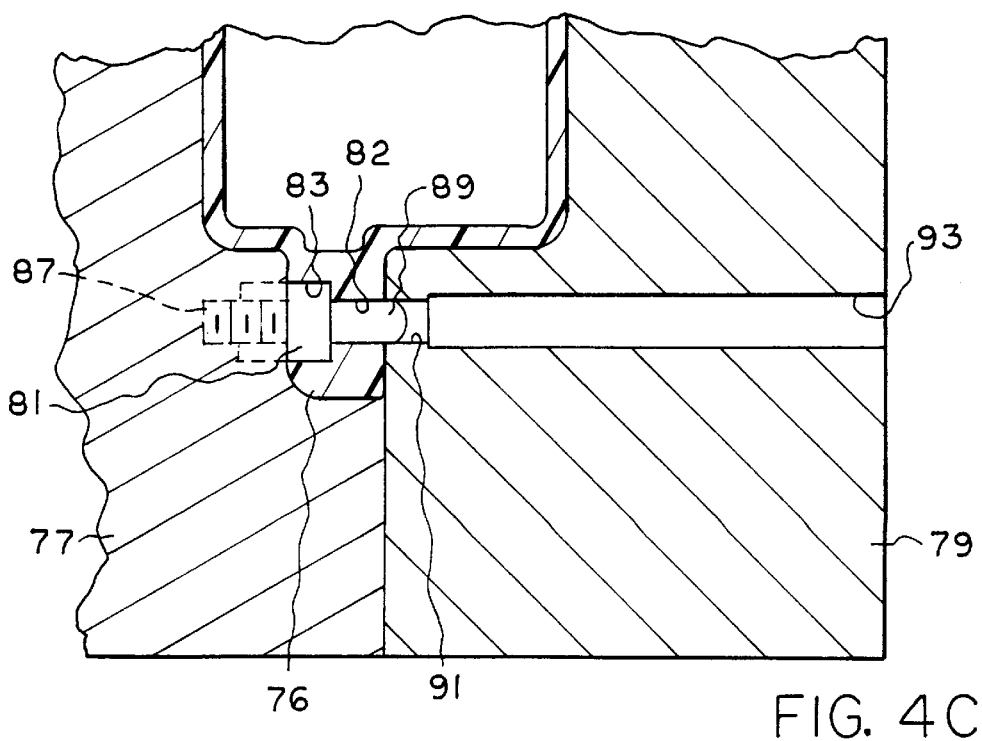
FIG. 4C is a sectional view illustrating formation of one of the flange portions at a location along its length where it is attached to the other flange portion.

If the flange portions 76 were hollow at the locations of the apertures 82, there may be a tendency for the walls of the flange portions to collapse as the nuts 85 are tightened onto the bolts 84. In order to prevent this from occurring, the flange portions 76 are formed to be solid, as illustrated in FIG. 4B. Referring to FIG. 4C, there is illustrated the process of forming the flange portions 76 with the solid portions at the apertures 82. The blow mold portions therefor are illustrated at 77 and 79. Mold portion 77 contains an insert 81 which is received in a cut-out in the mold portion 77 and is attached thereto as by stud 87 so that a portion thereof protrudes into the mold cavity to form the counterbore 83, and a pin 89 extends therefrom to form the remainder of the aperture 82. Mold portion 79 has a bore 91 for receiving the pin 89 when the mold portions 77 and 79 close. The bore 91 is sized to have substantially the same diameter as that of the pin 89 so that a slug of the plastic material forming the flange portion is forced into the bore as the mold portions close. The bore 91 is increased in diameter, as illustrated at 93, for receiving the slugs and expelling them from the mold. As the molds close, the solid portions of the flange portion 76 around the apertures 82 respectively are accordingly compression molded while the remainder of the flange portion is blow molded to be hollow.

Figure 9:
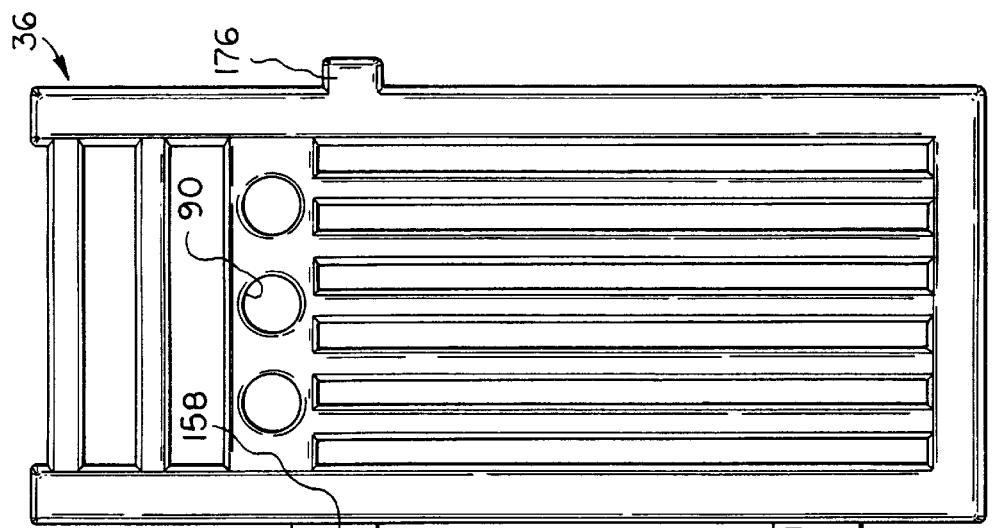
FIG. 9 is a view similar to that of FIG. 8 of the inner side of the gate.
Figure 10:
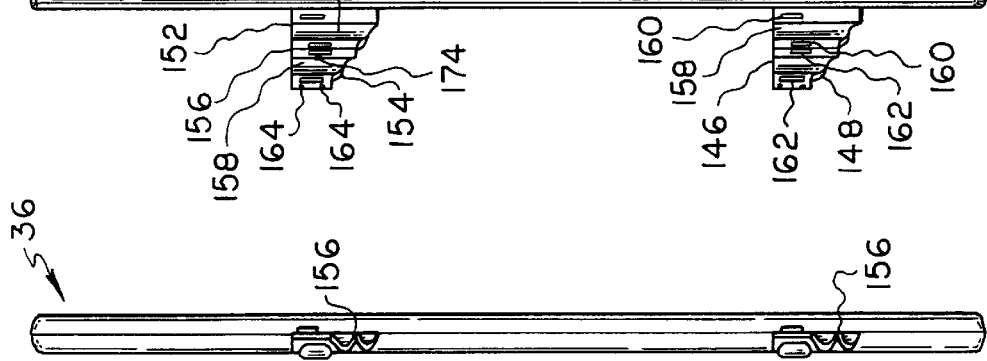
FIG. 10 is an elevation view of the edge of the gate to which the hinges are attached.
Figure 8:
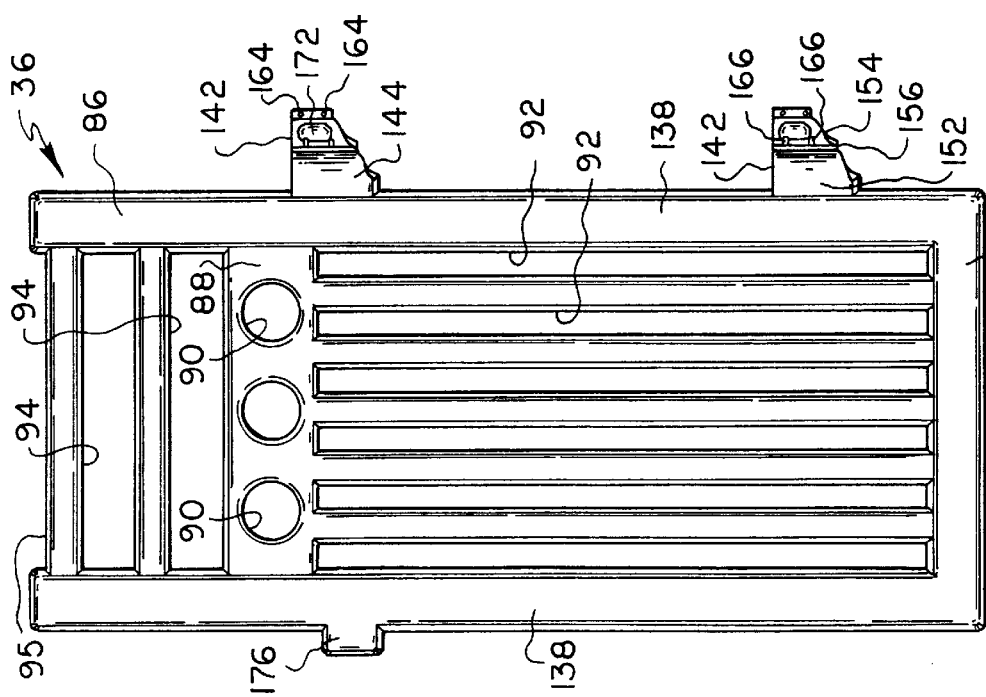
FIG. 8 is an outer side elevation view of the gate before its installation to a staircase.
Figure 11:
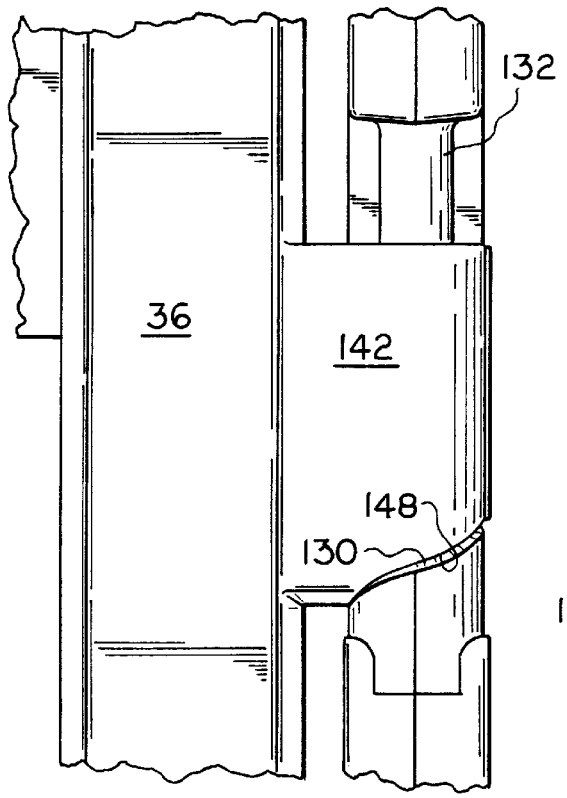
FIG. 11 is an enlarged partial outer view of one of the hinges.

Referring to FIGS. 8, 9 and 10, the gate 36, which is generally rectangular, is formed to have a perimetric portion 86 of increased thickness extending along the sides and bottom and is further formed to have a horizontal portion 88 a little below the top thereof in which are provided a plurality of, for example, three horizontally spaced handholes 90. A plurality of horizontally spaced rectangular elongate openings or cut-outs 92 extend downwardly from the portion 88 to define ventilation holes. A pair of vertically spaced rectangular elongate openings or cut-outs 94 are placed above the portion 88.

Figure 5:
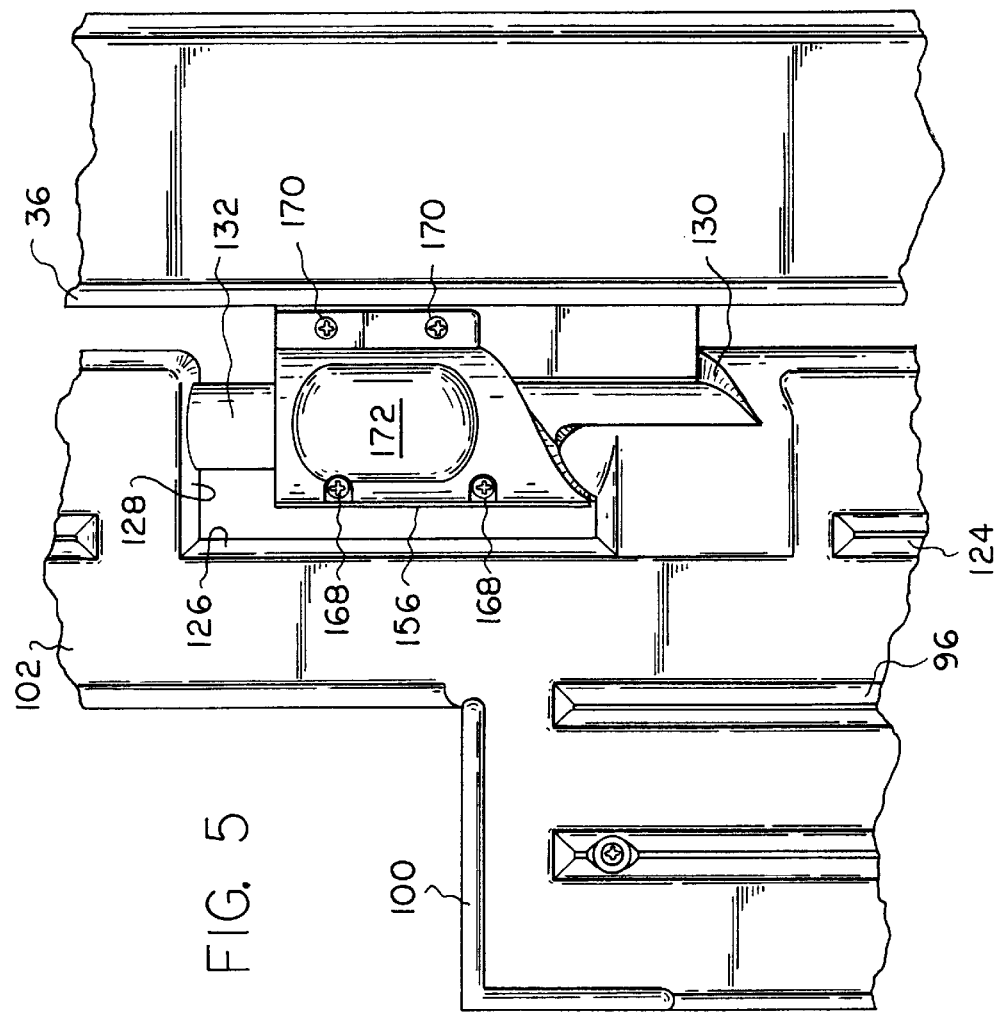
FIG. 5 is a partial enlarged elevation view of a hinge therefor.
Figure 6:
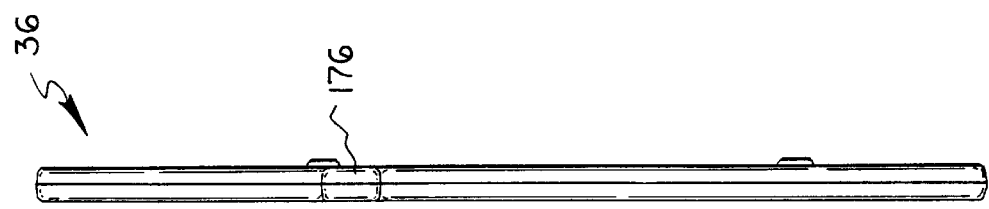
FIG. 6 is a latch side edge elevation view of the gate.

Referring to FIG. 5, the gate 36 is hingedly attached, as described hereinafter, to one of the handrail members 38 by means of a blow-molded plastic (or other suitable material) adapter member 96 which is attached, as hereinafter described, to the front edge portion of the handrail member 38 and latchingly attachable, as hereinafter described, to the other handrail member 38 by means of a blow-molded plastic (or other suitable material) adapter member 98 which is similarly attached to the front edge portion of this other handrail member 38.

It should however be understood that the gate 36 may alternatively be attached directly to the handrail members 38, without the use of such adapter members, in which case one of the handrail members would be formed to have hinge means and the other handrail member would be formed to have latch means. Such an alternative embodiment is meant to come within the scope of the present invention.

Each adapter member 96 and 98 is blow molded of plastic or other suitable material to have a first or rear portion 100 which is attachable, as described hereinafter, to the forward edge portion of the respective handrail member 38 and a second or forward portion which contains either the hinge or latch means, the second portion being identified generically by reference numeral 103 and by reference numerals 102 and 104 for the adapter members 96 and 98 respectively.

The height of the first portion 100 is such that it extends to but terminates short of the handrail portion 52 and the bottom step 40 at its upper and lower ends respectively. The first portion 100 comprises a pair of substantially identical generally parallel sheets 106 which are integrally attached to and extend from the second portion 103 but are not integrally attached to each other. The rearward edge of the first portion 100 is defined by a pair of tab portions 108 which extend from the respective sheets 106 toward each other. The tab portions 108 terminate short of the top and bottom edges thereof. The forward edge portion 110 of the respective handrail member 38 is formed to have inwardly extending longitudinal projections 112 from each of its walls which define grooves 113. These projections are aligned with each other respectively and extend to and are integral with each other respectively. The sheets 106 are spreadable like jaws to receive the forward edge portion 110 of the respective staircase side member 38 between them and resiliently close on the staircase side member 38 with the tab portions 108 grabbing or extending partially around wall portions of corresponding projections 112 to secure or stabilize the adapter member position relative to the staircase side member 38.

Each of the sheets 106 is formed to have a longitudinal portion 114 which projects inwardly toward the other sheet and in alignment with the corresponding handrail projections 112, terminating short of the top and bottom of the sheet. A plurality of, for example, three longitudinally spaced button portions 116 are formed in the grooves 118 defined by the projections 114, and the projections 114 are discontinuous at the locations of the button portions 116. These button portions 116 are formed to have closed-bottom bores at 120 therein for receiving self-threading screws 122. The button portions 116 in one of the sheets 106 are offset longitudinally from the button portions 116 in the other sheet 106. In order to rigidly securely attach the first portion 100 of the adapter member to the respective staircase side member 38, the self-threading screws 122 are screwed through the sheets 106 and the corresponding projections 112 and tightened.

An adapter member 96 and an adapter member 98 are desirably blow molded as a unit with the tab portions 108 back-to-back so that the opening defined between the tab portions 108 for each adapter member may be formed closed by means of closure portions, and closure portions may also be formed about the top and bottom openings between the sheets 106 whereby the unit may be formed more easily in accordance with conventional blow-molding procedures. After the unit is blow-molded, the closure portions may be removed and the adapter members 96 and 98 separated with a knife or the like.

The second portions 103 of the adapter members are of generally the same height and extend downwardly beyond the first portions 100 to terminate at the skirt 60 and extend upwardly beyond the first portions 100 for a suitable distance above the handrails 52. The widths of the first and second portions 100 and 103 respectively may be, for example, about 3½ and 4¼ inches respectively. Each of the second portions 103 is formed to have a longitudinal groove 124 centrally thereof which is discontinuous in the vicinity of notches or cut-outs, described hereinafter, and at the top and bottom thereof.

Referring to FIG. 5, the second portion 102 of adapter member 96 is formed to have a pair of upper and lower generally rectangular notches or cut-outs 126 extending from the outer of free edge about half way across the width thereof and each defining a generally flat upper wall 128 and a lower wall 130. A cylindrical hinge pin 132 extends between the upper and lower walls 128 and 130 respectively. The hinge pin 132 may, for example, have a length of about 6½ inches, a diameter of about 1 inch, and a spacing from the outer or free edge of the second portion of about ⅜ inch.

Figure 12A:
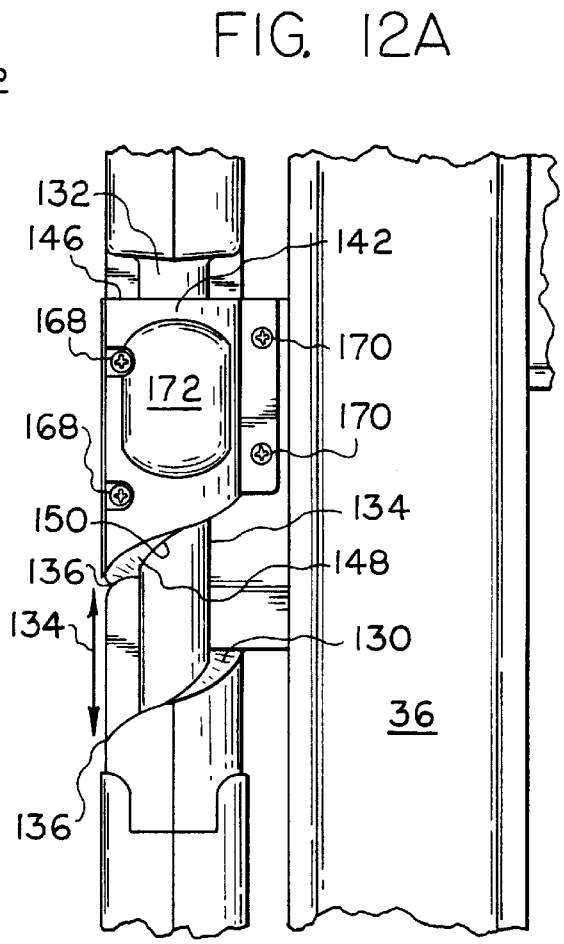
FIG. 12A is an enlarged partial inner view of the hinge.

In order that the gate 36 may be self-closing, in accordance with the present invention, the lower wall 130 is formed, as best seen in FIG. 12A, to spiral downwardly around the hinge pin 132 through about 360 degrees in a clockwise direction (direction in which the gate 36 swings shut) over a suitable distance, illustrated at 134, of, for example, about 2½ inches, beginning and ending at points, illustrated at 136, which face inwardly (toward the other staircase side 38).

The gate 36 has increased thickness side portions 138 and an increased thickness bottom portion 140 defining and providing increased strength to the gate perimeter along the sides and bottom thereof respectively. A pair of vertically spaced members 142 extend outwardly from one of the side portions 138 along the forward part of the side portion so as to aesthetically present (to one walking toward the gate) a surface 144 which is substantially flush with the forward surface of the side portion 138. These members 142 are formed into hinges, as hereinafter discussed, each of which has a generally flat upper wall 146 and a lower wall 148. The lower wall 148 spirals downwardly around the hinge opening 150, in which the hinge pin 132 is received, through about 360 degrees in a clockwise direction over substantially the same distance as distance 134 beginning and ending at points 136 when the gate is closed. The gate 36 is shown open in FIG. 12A. Under the force of gravity, the spiral hinge wall 148 slides down the complementary spiral hinge pin wall 130, swinging the gate 36 closed.

Figure 12B:
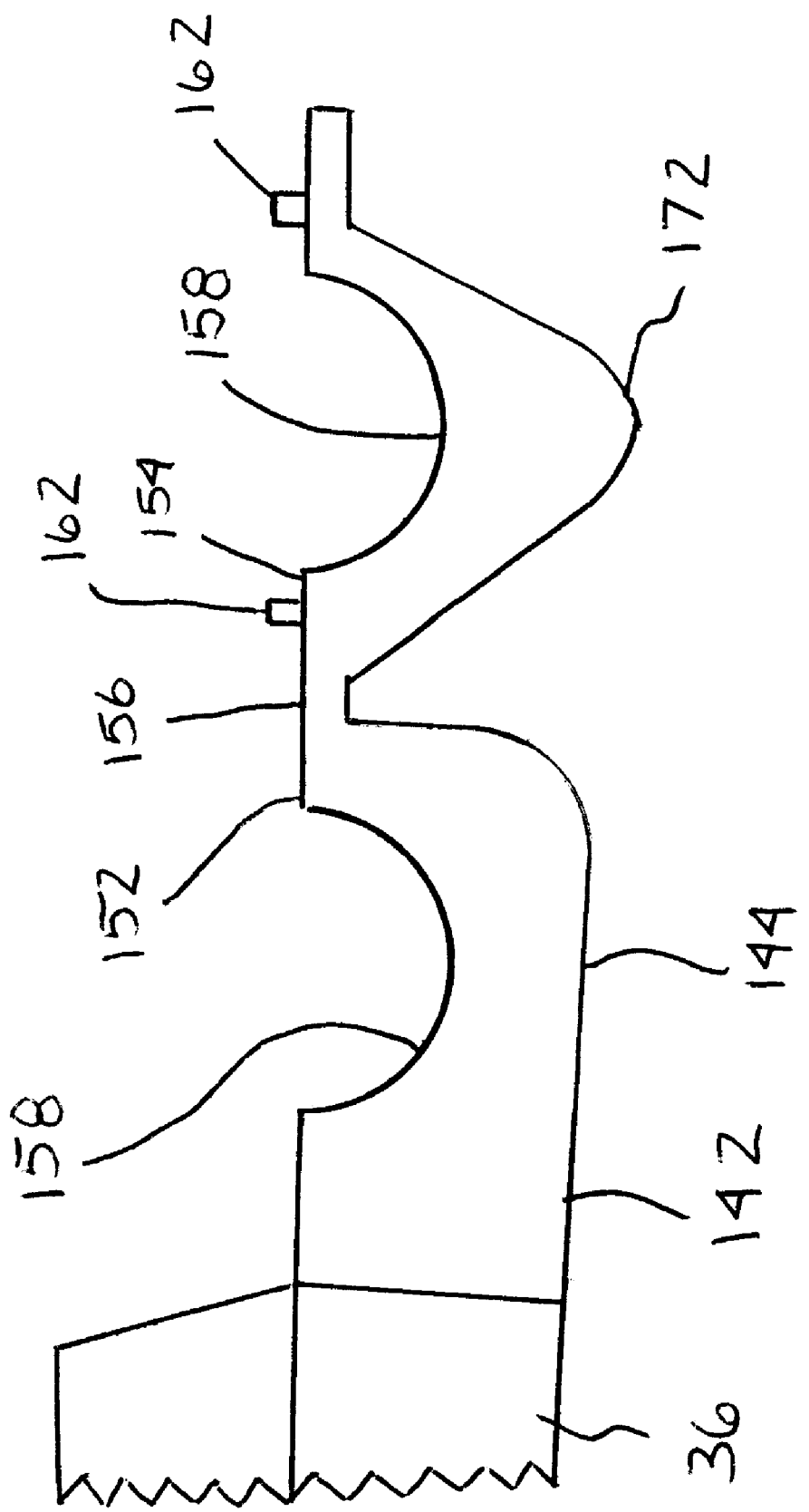
FIG. 12B is a plan view of the hinge.
Figure 19:
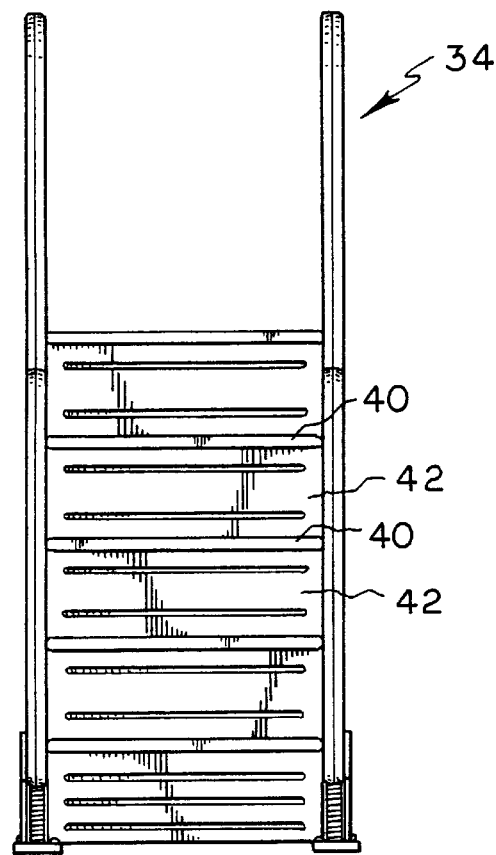
FIG. 19 is a front elevation view, with parts broken away, of one of the staircases.
Figure 20:
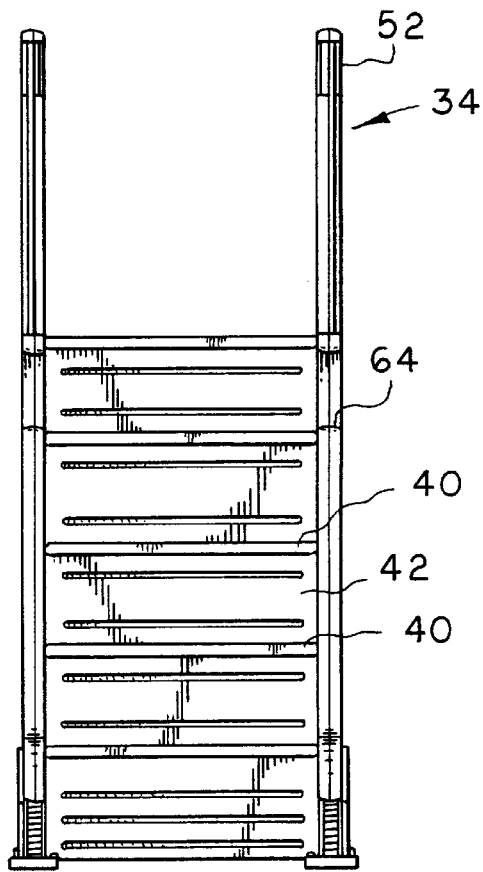
FIG. 20 is a rear elevation view, with parts broken away, of the staircase.
Figure 21:
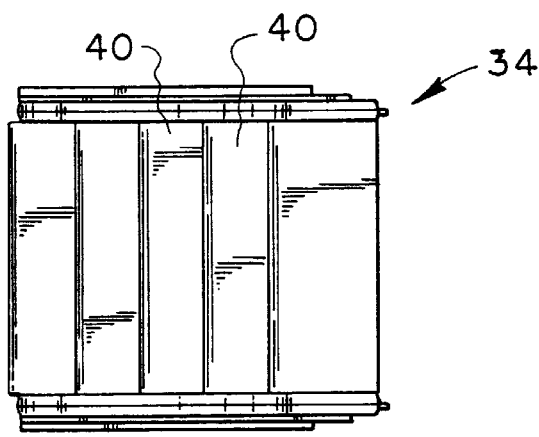
FIG. 21 is a top view of the staircase.
Figure 22:
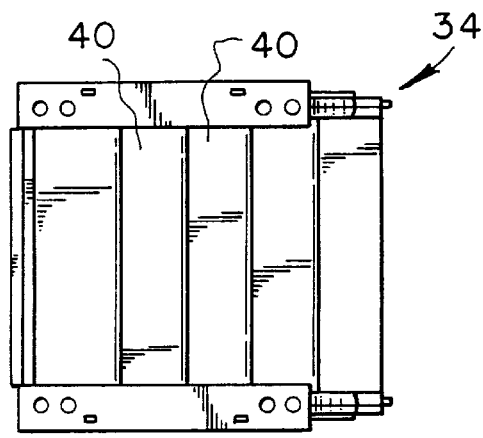
FIG. 22 is a bottom view of the staircase.
Figure 23:
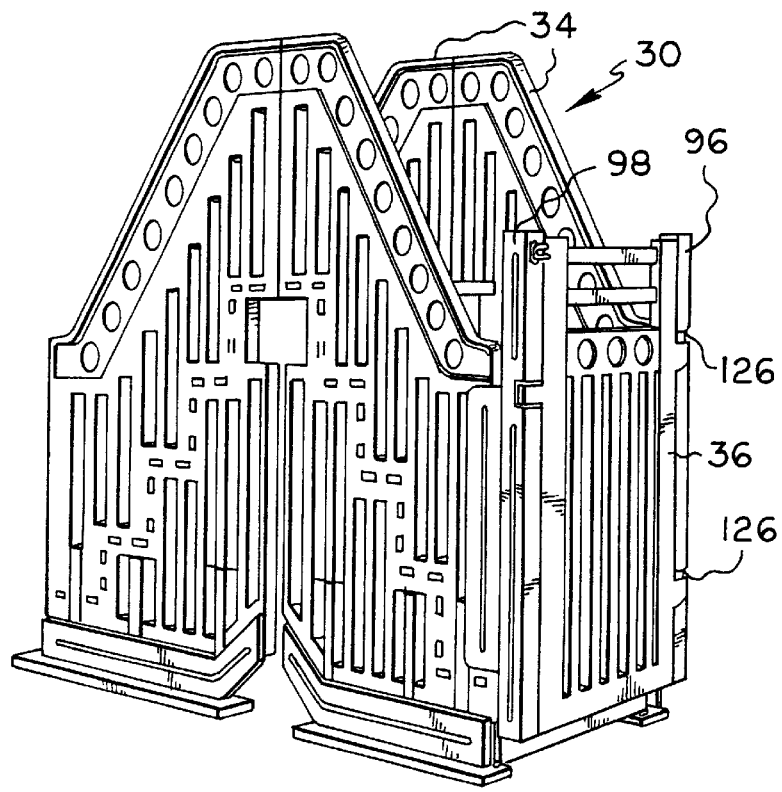
FIG. 23 is a view similar to that of FIG. 1 of the pair of staircases and gate without the swimming pool wall.

The hinge 142 is molded to have a first half 152 connected to the gate edge portion 138 and a second half 154 which is connected to the first half 152 by a living hinge, illustrated at 156, i.e., wherein the thickness is reduced to nearly zero thickness, for example, from a thickness of ⅜ inch to a thickness of about 1/32 inch or less so that the second half 154 may be rotated about hinge line 156 through 180 degrees relative to the first half 152 to face and engage the first half 152, the hinge line 156 being parallel to gate edge portion 138. Each of the hinge halves 152 and 154 is shaped to have a semi-circular groove 158 which extends parallel to and closely adjacent to the hinge line 156 (i.e., separated therefrom by, for example, about ⅜ inch). When the hinge halves 152 and 154 are caused to face and engage each other, the semi-circular grooves 158 together define the circular hinge opening 150. The first hinge half 152 has an elongate indent 160 in its flat surface on each side of its semi-circular groove 158. The second hinge half 154 has a complementary elongate projection 162 in its flat surface on each side of its semi-circular groove 158. When the second hinge half 154 is closed onto the first hinge half 152, the projections 162 engage the indents 160 respectively to stabilize the position of the second hinge half 154 relative to the first hinge half 152. Outwardly of the outer projection 162 in the second hinge half 154, i.e., between the outer projection 162 and the free edge of the second hinge half 154, are a pair of vertically spaced apertures, illustrated at 164. A pair of vertically spaced apertures, illustrated at 166, are also provided in the second hinge half adjacent the living hinge edge thereof, with the apertures 166 positioned beyond the ends of the corresponding projection 162 respectively. In order to secure the two halves 152 and 154 together to form the hinge opening 150 about hinge pin 132, self-threading screws 168 are threadedly received in apertures 166 and tightly threadedly engage the first hinge half 152, and self-threading screws 170 are threadedly received in apertures 164 and tightly threadedly engage the first hinge half 152. The living hinge 156 requires that a separate blow needle be provided for blow molding the second or outer hinge half 154. In order to provide sufficient distance between the walls of this hollow hinge half 154 to achieve an adequate needle blow clearance for providing blow air for forming the hinge half 154, its exterior wall is bulged outwardly, as illustrated at 172 in FIGS. 12A and 12B, centrally thereof. A blow needle hole, illustrated at 174 in FIG. 9, is accordingly located centrally of its interior surface.

Thus, as described above, the hinge members are molded integrally with the gate so as to provide a more durable product while avoiding the costly process of separately installing hinges.

Figure 24:
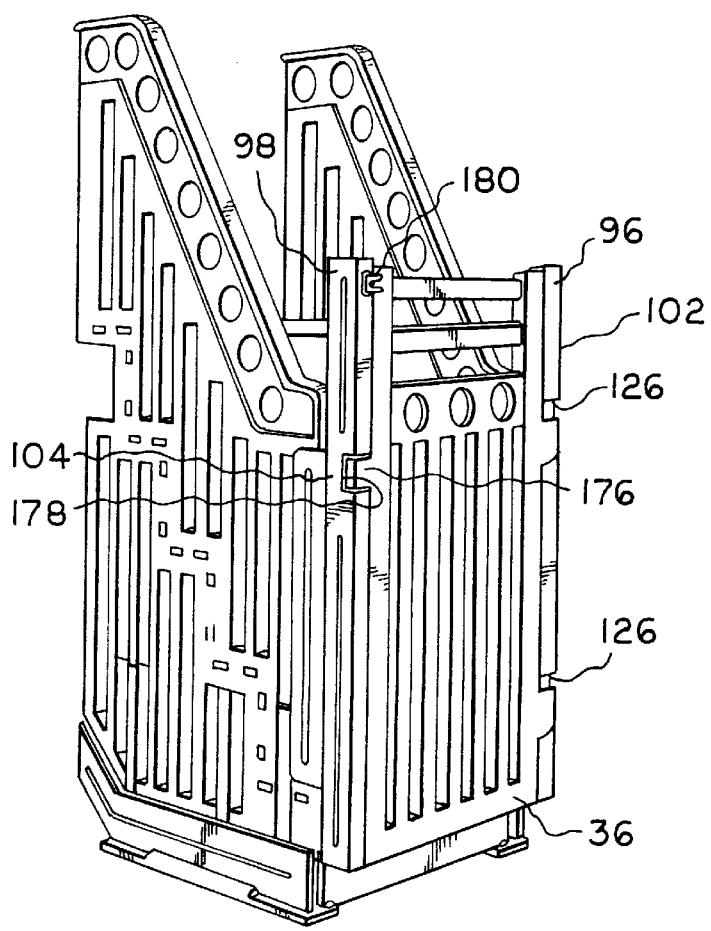
FIG. 24 is a view similar to that of FIG. 1 of one of the staircases and the gate.

Referring to FIG. 24, the latch side of the gate 36 has a generally rectangular projection 176 which is co-planar therewith and which is intermediate the upper and lower door edges. The second portion 104 of adapter member 98 has a generally rectangular complementary notch, illustrated at 178, formed in its outer edge for receiving the projection 176 when the gate 36 is closed so that the gate may withstand the forces of children hanging on the gate.

Figure 25:
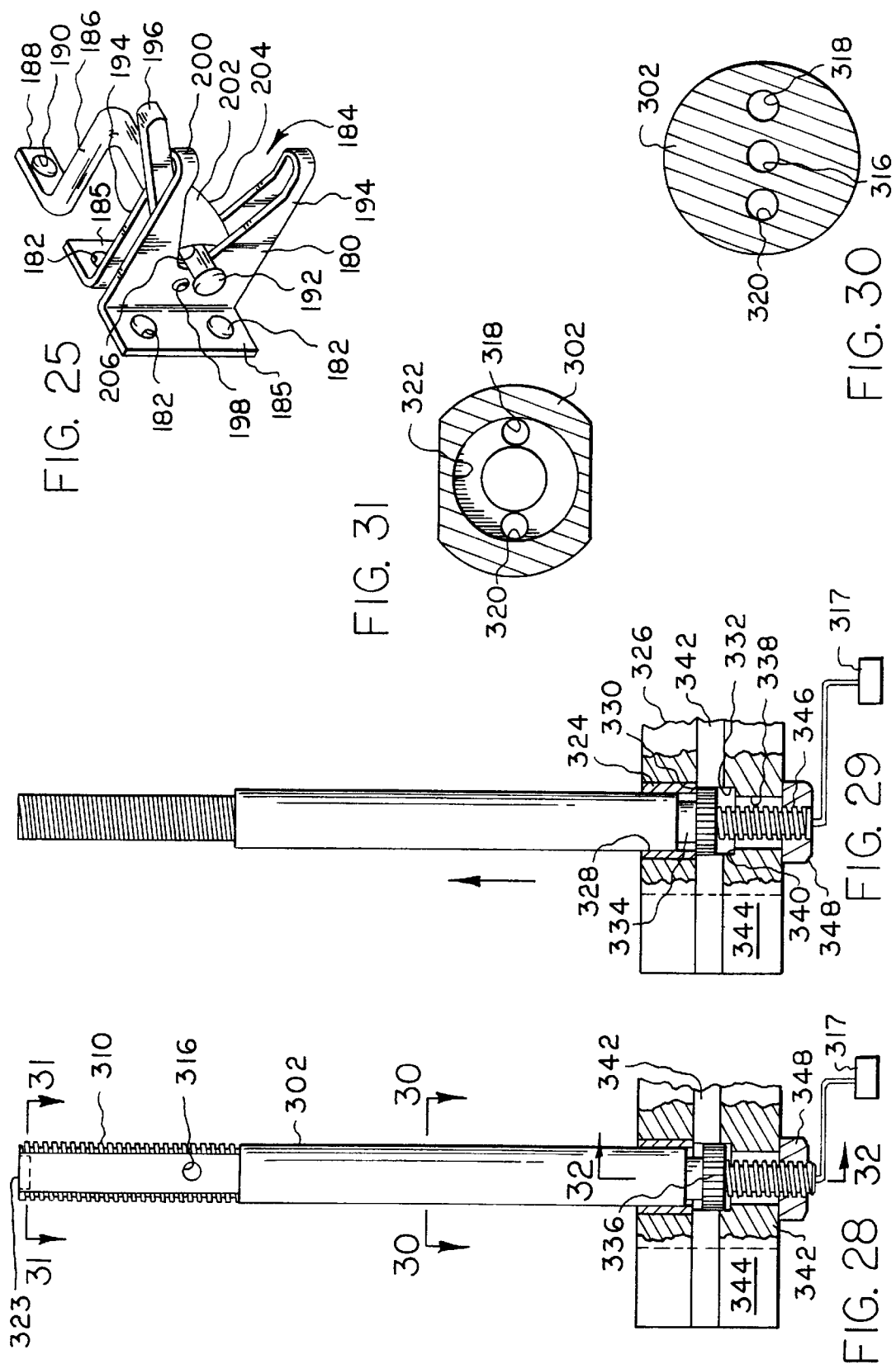
FIG. 25 is a perspective view of a latch for the gate.

Referring to FIGS. 24 and 25, the upper end portion of the second adapter member portion 104 has a latch 180 attached thereto such as by suitable fasteners (not shown) received in apertures 182 and screwed into the adapter member portion 104. The latch 180 is shaped to define a recess, illustrated at 184, in which is received a member 186 when the gate is closed. The member 186 is shaped to have one portion 188 attached to the gate such as by a suitable fastener (not shown) received in aperture 190 (or in each of a plurality of apertures) and screwed into the gate. The member 186 is also shaped to have a second portion 192 offset from the first portion 188 so that it is spaced from the gate and in a position to be received in recess 184. The latch 180 is formed from a sheet to be generally u-shaped thereby defining two parallel portions 194 which are both similarly shaped to define the recess 184, with a pair of flanges 185 extending in opposite directions from inner edges of the portions 194 respectively and containing apertures 182. A lever 196 is received between the portions 194 and pivotally mounted thereto as by pivot 198. The outer end portion of the lever rests on the upper outer curved portion 200 joining the parallel portions 194, and a cammed portion 202 extends downwardly therefrom and through the recess 184. The cammed portion 202 has an outer edge 204 which is curved outwardly as it extends upwardly whereby engagement thereof by the member portion 192 pushing inwardly causes the lever 196 to lift so that the member portion 192 enters between the cammed portion 202 and the bottom of the recess 184. The cammed portion 202 has an inner edge 206 which is curved inwardly as it curves upwardly whereby the lever 196 is restrained from lifting when the edge 206 is forced against the member portion 192. Thus, the gate 36 is self-latching and can be unlatched by manually raising the lever 196 so that the member portion 192 can then be freely removed from the recess 184. Such a self-latching mechanism is conventional, and it should be understood that any other suitable self-latching mechanism may instead be used and is meant to come within the scope of the present invention. If desired, a lock may also be provided for the gate.

Figure 13:
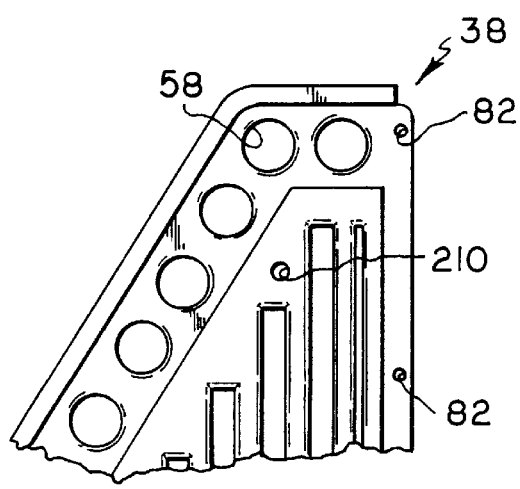
FIG. 13 is an enlarged partial outer view of the upper portion of one of the staircases.

Referring to FIG. 13, each of the staircase side members 38, which is hollow, has a hole, illustrated at 210, in its upper end portion and extending entirely through its outer wall to serve as a means of filling the hollow interior with water or other suitable ballast for adding weight to the staircase. This hole 210 is plugged by a tapered plug (not shown), composed of plastic or other suitable material, which is press fit in the hole.

Figure 14:
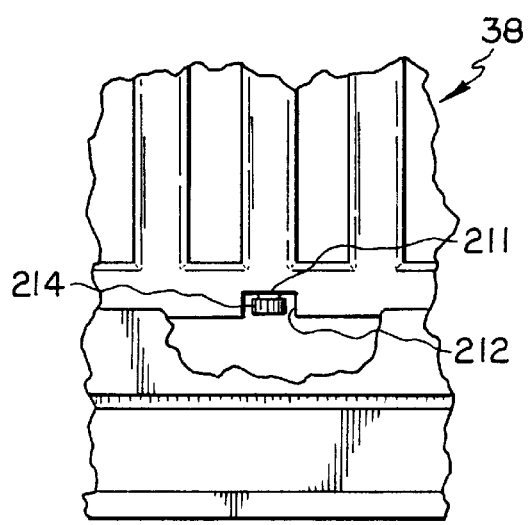
FIG. 14 is a view similar to that of FIG. 13 of a bottom portion of the staircase.

Referring to FIG. 14, the bottom of each staircase side member 38 has a recess 212 from the bottom of which an externally threaded cylindrical member 211 extends. An opening (not shown) is provided through the member 211 and the staircase side member wall to allow drainage of water or other ballast from the staircase. A cap 214 is threadedly installable on the member 211 so that the water or other ballast is contained within the staircase side member. This opening is formed by placement of the blow pin insert containing the blow pin for blowing air into the mold to form the member 38. The mold insert is suitably threaded to compression form the threads for the hole member 211 in accordance with conventional practice for blow molding external threads.

Referring to FIGS. 15 to 18, each of the staircase side members 38 is formed to have a forward and rear tubular portion 220 extending upwardly from the bottom thereof. Each tubular portion contains an elongate vertical aperture, illustrated at 222, which is open at the bottom thereof. For example, tubular portion may have a length of about 12 inches. The aperture 222 has generally flat sides and curved corners and has a minor diameter, illustrated at 224, between opposite side walls 226 which may be, for example, 1 9/16 inch and a major diameter, illustrated at 228, of, for example, about 1 11/16 inch.

Beginning, for example, about 3¼ inches from the bottom thereof and ending, for example, about ¾ inch from the upper end thereof, tubular member 220 has internal screw thread portions 230 (each, for example, about ¾ inch in length) on the inside surface of each of its opposite side walls 226 which together define thread means. An elongate rod 232 having, for example, a length of about 14 inches and a diameter of about 1⅝ inch has threads 234 extending about its circumference which are complementary to thread portions 230 so that rod 232 is threadedly receivable within tubular member 220.

The bottom of threaded rod 232 has an unthreaded section 236 over, for example, about 2 inches of its length. This section 236 has an upper portion 237 and a reduced diameter lower portion 238. This portion 238 contains a circumferential ridge 240 intermediate its length. The terminal part 239 of this portion 238 below the ridge 240 is hex-shaped or otherwise suitably shaped for application of a wrench for screwing the rod 232 into and out of the tubular portion 220. When rod 232 is turned clockwise, as indicated at 242, the rod 232 is screwed into the tubular portion 220, as indicated at 244.

A generally flat rectangular plastic (or other suitable material) stand or base 246 is provided for each staircase side member 38 for receiving the lower portions 238 of the forward and rear rods 232. The base 246 has a pair of apertures 248, spaced fore and aft, extending there through for the rear rod 232 and a pair of the apertures 248, spaced fore and aft, for the forward rod 232, the purpose of two apertures for each rod being to make each base usable for either a right side staircase side member or a left side staircase side member whereby the bases for both sides may be identical so that it is desirably not required that two different configurations of the base be molded. The upper portion 250 of each aperture 248 has a reduced diameter which is slightly less than the diameter of ridge 240 as well as less than the diameter of portion 237. The lower portion 238 of the rod 232 is inserted in the respective aperture 248 with the ridge 240 received in the increased diameter lower portion 252 of the aperture 248 by snapping the ridge 240 through the decreased diameter upper aperture portion 250. Thus, the rod 232 is prevented by the ridge 240 from becoming detached from stand 246, and the portion 238 is captured within aperture portion 250 against axial movement of the rod, yet the rod is freely rotatable within the stand. The thickness of the stand 246 is such that the bottom end of the rod 232 does not extend out of the aperture 248 and below the stand 246. The diameter of aperture portion 252 is such as to allow a wrench to be received on hex portion 239 for turning thereof.

A series of, for example, four apertures 254 in the portion 237 of the hollow rod 232 are circumferentially evenly spaced thereabout. These apertures are sized, for example, to have a diameter of about ¼ inch to receive a tool (rod) for turning the threaded rod 232.

The four threaded rods 232 are provided for adjusting the height of the staircase 34 at four corners with the stands 246 providing stability so that the staircase can be adapted to irregular terrain without the necessity of having to first level the terrain. The hex portions 239 are used to insert the rods into the tubular members and effect threaded engagement thereof and for rough height adjustment prior to erecting the staircase in position. Fine height adjustment is obtainable by means of apertures 254 after the staircase is erected. The staircase may accordingly be adjustable to fit pool heights of, for example, 48 to 54 inches.

Internally threaded members have conventionally been manufactured separately and thereafter connected to the blow-molded members. In accordance with the present invention, the internally threaded tubular member 220 is integrally and more efficiently formed as part of the blow-molding process, as described hereinafter. This allows the staircase to be more durable as well as less costly to manufacture.

Referring to FIGS. 26 to 36, there is illustrated generally at 300 apparatus for extending and retracting externally threaded rods 302, which may, for example, be composed of brass, into the mold 304 for blow-molding internally threaded tubular portions 220 respectively as part of the blow molding process for the staircase side member 38. The rod 302 is cylindrical with the upper end portion being threaded. The thread portions 230 are compression molded between the walls of the mold cavity and the rods 302 while at the same time the remainder of the tubular portions 220 as well as the remainder of the staircase side member 38 are conventionally blow molded.

As seen in FIGS. 33 and 34, the upper end portion of rod 302 is truncated on opposing sides 306 to have a minor diameter, illustrated at 308, and has thread portions 310 on its other opposing sides 312 to have a major diameter, illustrated at 314. FIGS. 33 and 34 illustrate the tubular member 220 and its internal thread portions 230 being formed. After the tubular member 220 is thereby formed, the rod 302 is turned ¼ turn or 90 degrees to the position shown in FIG. 35 while simultaneously retracting at a rate corresponding to the thread pitch, which may, for example, be a 1 in 4 thread pitch, so as not to rip or strip the newly molded thread portions 230 during the 90-degree rotation. As seen in FIG. 35, the truncated sides 306 of the rod 302 clear the newly formed thread portions 230 with the result that the rod 302 can be and is retracted from the mold 304 without ripping the thread portions 230.

Compressed air is routed from a suitable source, illustrated at 317, through internal passage, illustrated at 316, in the rod 302 which has an outlet on one of the truncated sides 306, as seen in FIG. 28, to blow mold the tubular member 220 within the mold cavity therefor, with the thread portions 230 being at the same time compression molded. The remainder of the staircase side member 38 is blow-molded at the same time in accordance with conventional blow molding procedures. Internal passage 318 is suitably provided in each brass rod 302 for providing a flow of water for cooling thereof. Internal passage 320 in each rod 302 is for return water flow. The passages 318 and 320 open into an annular passage or loop 322 at the terminal end of rod 302 for interconnecting water cooling and return flow passages 318 and 320 respectively. The passages are formed by machining through the upper end portion of the rod 302, and this machining entrance is thereafter closed by a plug 323 soldered therein or by other suitable means.

The lower end portion of each rod 302 is rotatably received within bushing 324 which is in turn received within the upper end portion of an aperture 328 which aperture in turn passes entirely through housing block 326. The bushing 324 rests on a shoulder 330 formed by a reduced diameter intermediate portion 332 of the aperture 328. The rod 302 has a reduced diameter portion 334 which extends below the shoulder 330. A spur gear 336 is mounted on this portion 334. The aperture 328 has a further reduced diameter lower end portion 338 which defines another shoulder 340. The diameter of the gear 336 is greater than the inner diameter of the bushing 324 as well as the diameter of lower aperture portion 338. The gear 336 is thus movable axially over the distance between the bottom of bushing 324 and shoulder 340. A rack 342, driven in opposite directions by a pair of pneumatic cylinders, illustrated at 344 in FIGS. 26 and 29, respectively engages spur gear 336 for rotation of the rod 302 back and forth through 90 degrees or ¼ turn between the position shown in FIG. 29 for molding the thread portions 230 and the position shown in FIG. 28 so that the rod 302 may thereafter be retracted without stripping the newly formed thread portions 230.

The lower end portion 346 of the rod 302 below the spur gear 336 is of further reduced diameter and is threaded to the same pitch as thread portions 310. The rod portion 346 is threadedly received in nut 348, which is welded or otherwise suitably fixedly attached to housing 326. Thus, as the rod 302 is rotated through ¼ turn or 90 degrees, it is caused by nut 348 to move axially at the same rate as the pitch of the newly formed thread portions 230 so that they are not ripped during such rotation. During such movement, the spur 336 is shown to move axially between the lower and upper positions shown in FIGS. 28 and 29 respectively.

Figure 26:
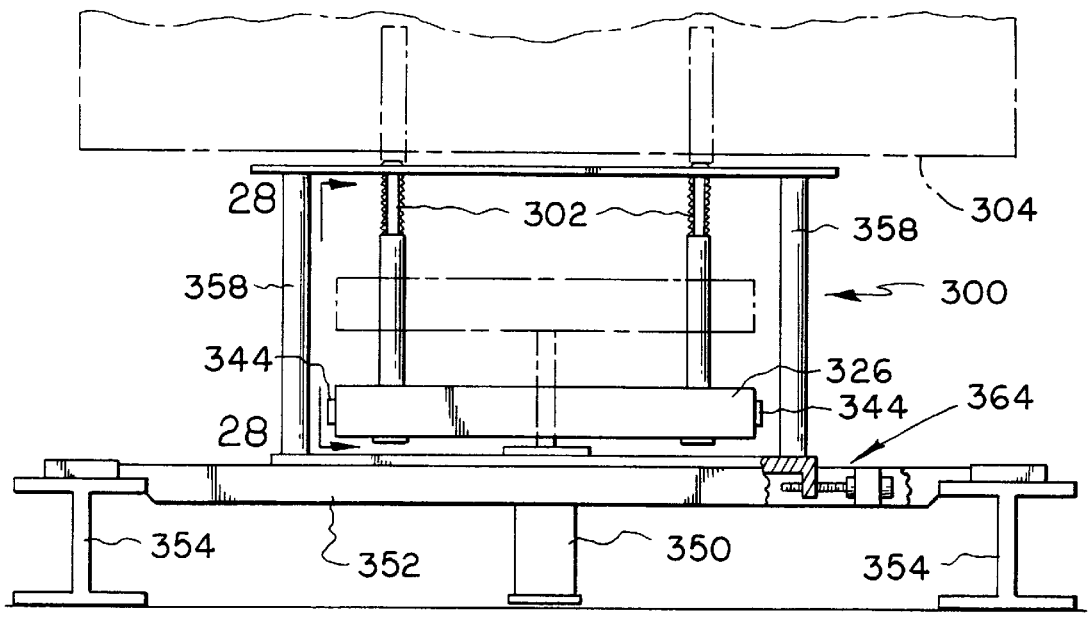
FIG. 26 is a side elevation view, with a portion broken away and sectioned, of apparatus for forming internal threads for height adjusting screws for the staircases.
Figure 27:
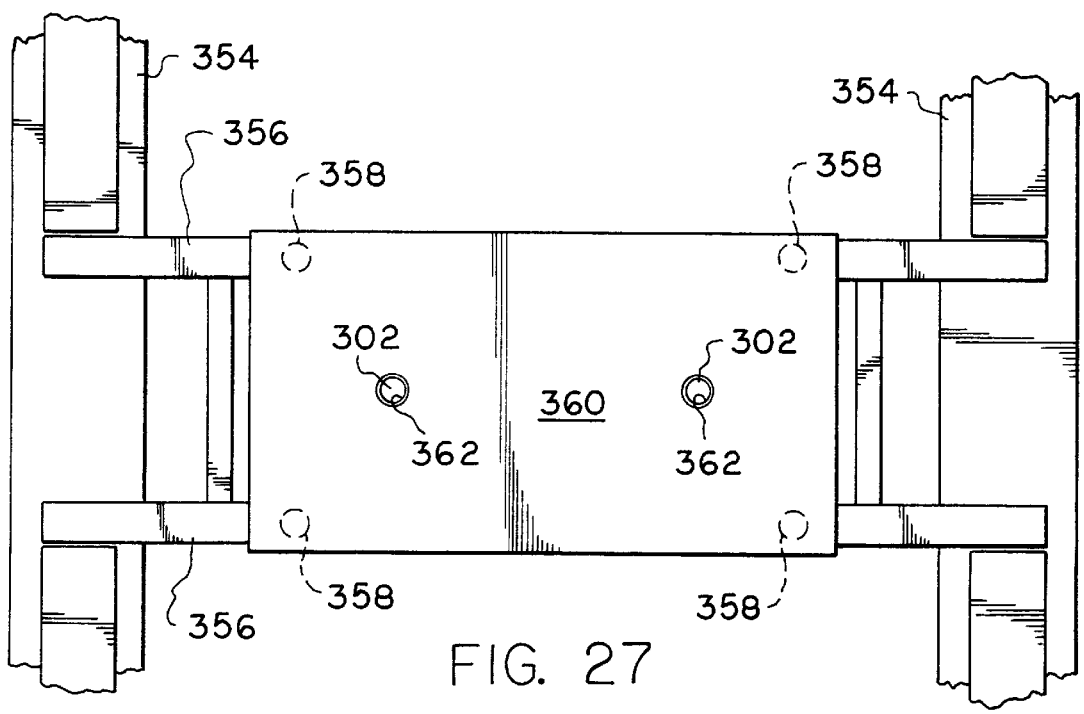
FIG. 27 is a plan view of the apparatus of FIG. 26.

An hydraulic cylinder 350 is suitably mounted vertically to a platform 352 to rest on a floor and to move housing 326 between the extended or raised position shown in phantom lines in FIG. 26 for molding and the retracted or lowered position shown in solid lines in FIG. 26. The platform 352 is supported on I-beams 354 or the like. The platform 352 supports a pair of elongate bottom plates 356 which are braced by cross members 357 and to which are mounted four corner posts 358. The posts 358 support a generally rectangular guide plate 360 having apertures 362 for guiding the movement of the rods 302 so that they remain aligned. A ratchet assembly, illustrated at 364, is provided for positioning the guide plate 360.

For molding, with the rods 302 positioned at the position shown in FIG. 35, they are raised by hydraulic cylinder 350 to the position illustrated in phantom lines in FIG. 26 at the start of the extrusion cycle for molding. The rods 302 are then rotated 90 degrees or ¼ turn by rack 342 into the compression position shown in FIG. 34 for molding. The mold cavity closes around the threaded rods 302, compression forming the thread portions 230, while at the same time compressed air is introduced through passage 316 to the remaining area in the thread cavity for blow molding the remainder of the tubular member 220 and at the same time compressed air is introduced for blow molding the remainder of the staircase side portion 38. Upon completion of the compressed air drain cycle and the decompression cycle, the rods 302 are rotated 90 degrees or ¼ turn back to the position illustrated in FIG. 35 by the rack with the nut 348 effecting movement of the rods 302 axially at the same pitch as the newly formed threads 230. The rods 302 are then retracted from the newly formed staircase side member 38 by hydraulic cylinder 350 to the position shown in solid lines in FIG. 26 so that the newly formed staircase side member 38 may be removed from the mold.

Figure 37:
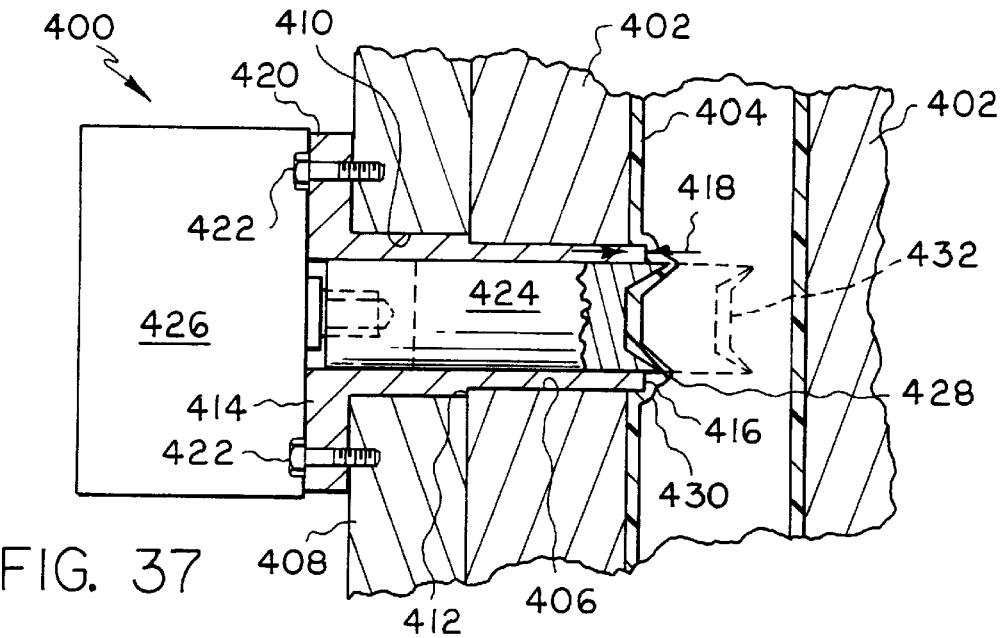
FIG. 37 is a sectional view of apparatus illustrating forming a hole during the blow-molding process in a wall of one of the staircases.

Referring to FIG. 37, there is shown generally at 400 apparatus for forming the hole 210. The blow molding process conventionally does not allow the formation of such holes, except holes formed by the blow needle, as part of the process since the process requires air to be introduced through the blow needle into a tube of hot plastic forcing it against the mold walls, thus requiring the mold walls to be sealed against escape of the air. As a result, holes such as hole 210 have been conventionally formed in an article after it has been blow molded. In order to more efficiently and quickly form the hole 210 without the added step of forming the hole after the blow molding process, in accordance with the present invention, the hole 210 is formed during and as part of the blow molding process using the apparatus 400.

Walls of the mold are illustrated at 402, and a tube of hot plastic material which is forced or blown against the mold walls 402 to form the article (in this case, a staircase side member 38) is illustrated at 404. A cylindrical opening, illustrated at 406, is formed in the mold wall 402 at the point where the hole 210 is to be formed. A backing plate 408, which has a cylindrical opening 410 aligned with opening 406, is suitably attached as by bolts (not shown) to the mold wall 402. The diameter of opening 410 is greater than the diameter of opening 406 thereby defining a shoulder 412. A sleeve 414 is received in the aligned openings 406 and 410. The intermediate sleeve portion which is received in opening 410 has an increased diameter to conform to the diameter of opening 410. The inner end 416 of the sleeve extends inwardly beyond the mold wall 402 by a distance, illustrated at 418, which is equal approximately to the thickness, for example, about ⅛ inch, of the formed member 404. The other end of the sleeve 414 terminates in an enlarged diameter cap portion or collar 420. A cylindrical punch 424 is received within the sleeve 414 and is driven by a suitable pneumatic cylinder, illustrated at 426. The cylinder 426 and collar 420 are attached as by screws 422 or otherwise suitably attached to the backing plate 408.

The inner end of the punch 424, which may, for example, be composed of aluminum, is formed with a sharp protruding cylindrical knife edge 428 which, during the blow molding but prior to the punching of the hole, extends beyond the inner end of the sleeve 414. This position of the punch 424 allows the formation of an increased wall thickness at the hole 210, as illustrated at 430, to provide enough surface area so that the hole can hold a friction type cap plug under the water pressure when the staircase side member 38 is filled to the top with water. If such increased wall thickness is not needed for a hole in an object to be blow molded, the punch 424 may be retracted so that it does not protrude out this far. The sharp protruding knife edge 428 is provided to create a circular line of weakness in the plastic material 404 to effect a clean hole at precisely that line when it is punched.

In order to form the staircase side member 38 with hole 210 therein, molten plastic material is extruded from an accumulator head, and the mold walls 402 are closed around the tube of hot plastic. The blow cycle is then started, and the plastic is forced against the mold cavity walls 402, as illustrated at 404, by air pressure of, for example, 80 to 100 psi. This part of the process is in accordance with principles commonly known to those of ordinary skill in the art to which this invention pertains. In accordance with the present invention, the plastic is also blown against the end portions of the sleeve 414 and punch 424, which protrudes into mold cavity thereby forming a wall for hole 210 which is thicker than the plastic would normally form. The punch 424 is moved forward (into the mold cavity), as illustrated in phantom lines in FIG. 37, after a period of time, dependent on temperature, plastic temperature, material thickness, air pressure, and the diameter of the hole to be formed, and this period of time is determined in accordance with the operator's experience. For example, for hole 210, the material of which the staircase side member 38 is formed may be high density polyethylene, the punch may have a diameter of about ⅞ inch, the wall thickness of the article to be formed may be about ⅛ inch, the mold temperature may be about 50 degrees F., the plastic temperature may be about 400 degrees F., and the movement of the punch forwardly may be delayed about 30 seconds after initiation of the blow cycle. The resulting slug, illustrated at 432, will either fuse to the opposed wall or drop to the bottom of the cavity depending on the temperature and on the timing of the punch. The drain cycle (air exhausted) is then started, and the punch is returned by cylinder 426 to the retracted position in preparation for another cycle.

Figure 38:
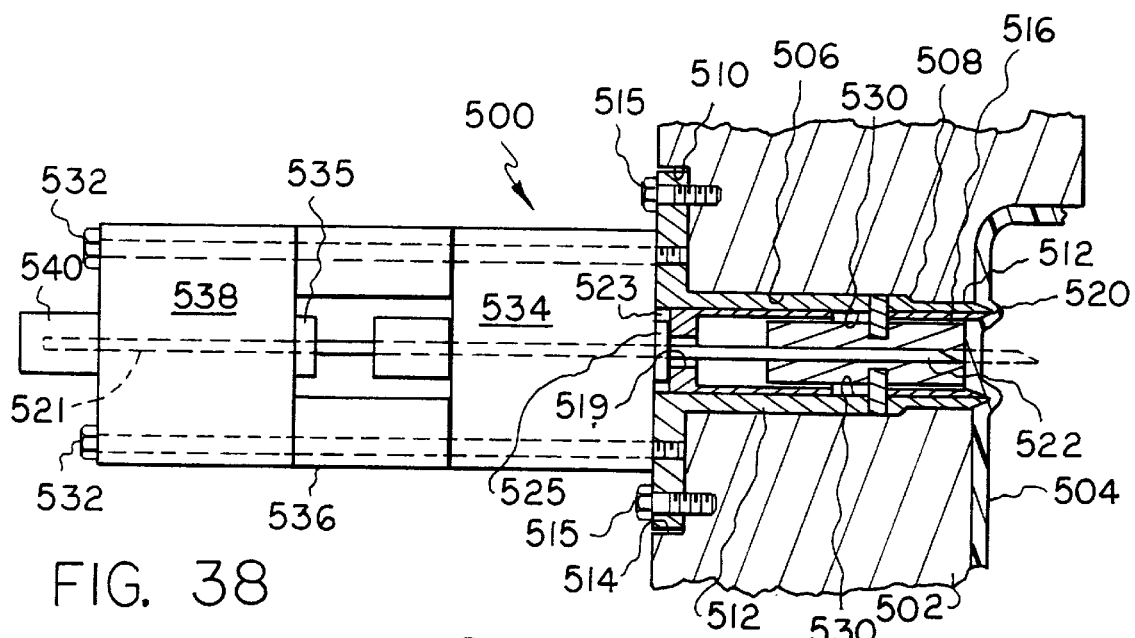
FIG. 38 is a view similar to that of FIG. 37 of an alternative embodiment of apparatus for forming a hole in a wall during blow-molding, illustrating a first stage of hole formation.
Figure 39:
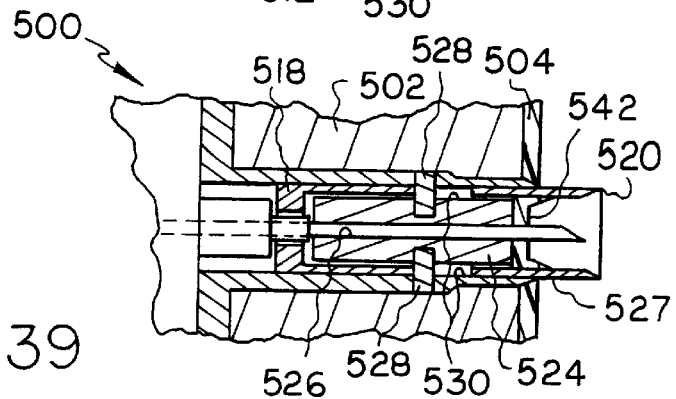
FIG. 39 is a view similar to that of FIG. 37 of the apparatus of FIG. 38, illustrating a second stage of hole formation.

Referring to FIGS. 38 and 39, there is shown generally at 500 apparatus for forming a hole during blow molding so that the slug is removed from the blow molded article in accordance with an alternative embodiment of the present invention. A mold wall portion is shown at 502, and the plastic material forming the article is shown at 504. The mold wall 502 has a stepped cylindrical opening 506 there through defining a shoulder 508. The opening 506 opens into an enlarged diameter recess 510 in its outer surface. A complementary sleeve 512 is received in the opening 506 and has a flange 514 which is received in the recess 510. The flange 514 is suitably attached to the mold wall 502 as by screws 515.

A hollow thin-walled punch 516, which may be composed of, for example, steel, is received within sleeve 512. The outer end portion 518 of the punch 516 has a decreased inner diameter defining an aperture 519, which is threaded and threadedly receives a reduced diameter end portion 523 of piston rod 525 of pneumatic cylinder 534. A rod 521 holding blow needle 522 as by a threaded aperture (not shown) for supplying air pressure for blow molding passes through an aperture in portion 523 and through the hollow interior of the punch 516, and the blow needle 522 extends therefrom into the mold cavity. The inner end of the punch 516 is formed to have a sharp circular knife edge 520 and extends evenly with the sleeve 512, and both the punch 516 and the sleeve protrude into the mold cavity by a small distance equal to about the wall thickness of the article to be made for precisely forming a clean hole, similarly as previously discussed with reference to FIG. 37. The sleeve 512 is also pointed, as illustrated at 527, at its inner wall so that the hole which is formed may be tapered to allow a tapered plug to be more easily inserted. In order to seal the hollow interior of the punch 516 against entrance of the plastic material, a filler wall or block 524 is received therein. This cylindrical block 524 has an aperture 526 axially there through in which is received the needle rod 521. The filler block 524 is fixedly attached to the sleeve 512 by a pair of pins 528 on diametrically opposed sides thereof. These pins 528 pass through corresponding opposed slots 530 in the wall of the punch 516 and fixedly engage the sleeve 512. The slots 530 are elongate axially of the punch 516 to allow axial movement of the punch 516 relative to the sleeve 512 and the filler block 524.

Attached to the flange 514 as by screws 532 are in tandem the pneumatic cylinder 534, adjacent the flange, for the punch 516, a spacer assembly 536, and another pneumatic cylinder 538 for the needle rod 521. An air inlet to the hollow needle rod 521 and there through to the needle 522 for blow molding is illustrated at 540. The needle rod 521 passes through passages in the cylinder 534 and piston rod 535 thereof and is threadedly received in the piston rod passage in accordance with conventional practice.

In order to blow mold an article with a hole in accordance with this embodiment of the present invention, the molten plastic is extruded out of the accumulator head, and the mold is closed around the tube of hot plastic. The blow needle 522 is pushed forward by the pneumatic cylinder 538, as illustrated in FIG. 39 and by phantom lines in FIG. 38, resulting in the piercing of the plastic wall. Air is then introduced from source 540 through the hollow cores of the rod 521 and blow needle 522 and into the interior of the tube of plastic, resulting in the formation of the mold cavity. After a period of time into the blow cycle, depending on temperature, plastic wall thickness, type of plastic, and configuration of the hole, as determined by the experience of the operator, the razor sharp hollow punch 516 is moved forward by pneumatic cylinder 534. For example, the plastic material may be high density polyethylene, the wall thickness to be formed may be about 0.09 inch, the mold and plastic temperatures may be about 55 and 350 degrees F. respectively, and the movement of the punch may be delayed for about 15 seconds after initiation of the blow molding process. The slug 542 which is created by the punch is captured within the portion of the hollow punch which is at this time forward of the filler block 524. The remainder of the blow cycle and the drain and mold open cycles are then completed. During the air drain cycle, the blow needle 522 is retracted to clear the slug 542, the movement of the slug 542 rearwardly being limited by filler block 524. After the mold returns to the open position and the molded part is clear of the cavity walls, the punch 516 is retracted to the fully back position, and a burst of air is sent through the blow needle 522 from source 540 to expel the slug 542 from the punch into a tray beneath the mold. Thus, the blow molded article advantageously does not have the slug 542 therein.

Referring to FIGS. 40 to 42, there is illustrated generally at 600 apparatus for forming a pair of holes, illustrated at 601, and fusing or bonding an injection molded insert to a blow molded part during the blow molding process. The provision of an injection molded insert allows the portion provided by the insert to have threads of higher quality. The injection molded insert is illustrated at 602 and includes two threaded portions 604. The plastic material forming the article to be made is illustrated at 606. The insert 602 has openings 608 and 609 therein, and holes 601 aligned therewith are formed in the blow molded portion of the article in accordance with this preferred embodiment of the present invention.

Punches 612 and 613, which may be composed of, for example, aluminum, and which have elongate cylindrical bodies 614, are suitably received for axial movement within bores in cylindrical housings 616 and in backing plates 618 attached to the housings 616 as by screws (not shown). The housings 616 are suitably received in cylindrical openings in the mold wall 619. Pneumatic cylinders 620 are attached to the backing plates 618 as by screws 622 for driving the punches 612 and 613 respectively in accordance with principles commonly known to those of ordinary skill in the art to which this invention pertains. One punch 612 terminates in a generally conical portion 624, and a needle 626 is press fit in a bore 628 therein for supplying pressurized air or gas to the mold interior for blow molding. Since only one needle is needed to supply blow molding air, the other punch 613 terminates in a frusto-conical portion 625 which does not have a needle. However, if desired, punch 613 may also be provided with a blow-molding needle. The punches may also be otherwise suitably shaped.

Each housing 616 at its inner end terminates in a reduced diameter tapered portion 630 which is complementary to and received in the respective opening 608 and 609 of the extruded part thereby in combination with the punch plugging the respective opening 608 and 609.

The needle 626, punch 612, and respective cylinder 620 have passages 632, 634, and 636 respectively which are suitably aligned for flow communication with each other and with a blow air inlet source, illustrated at 638, which is also a source of pressurized air or other suitable gas for the respective pneumatic cylinder 620 for punch 612. A pressurized air or other suitable gas source 639 (which may be the same or separate from source 638) provides pressurized gas for pneumatic cylinder 620 for punch 613. A circular line of weakness, illustrated at 640, is created where the generally conical portion 624 or frusto-conical portion 625 passes the end of the housing portion 630.

In order to blow mold the part 606 while fusing the insert 602 thereto and forming the holes 601 therein, in accordance with the present invention, the injection molded insert 602 is placed in the mold cavity with the punches 612 and 613 in the retracted position, as illustrated in FIG. 40. The molten plastic is then extruded out of the accumulator head, and the mold 619 is then closed around the tube of hot plastic. The trapped air causes the plastic tube within the mold cavity to blow up like a balloon resulting in a piercing of the tube by the blow needle 626, immediately followed by the introduction of air pressure by the blow needle from source 638 through passages 632, 634, and 636 for the blow cycle. After a suitable period of time, depending on mold temperature, plastic temperature, wall thickness, and air pressure, as determined by experience of the operator, the punches 612 and 613 are driven forward by pneumatic cylinders 620 respectively thereby causing a shear effect on the weakened areas 640 of the plastic material. The particular location of each weakened area 640 is dependent on the diameter of the respective hole 601 and the shape and diameter of the punch and again is determined by experience of the operator. For example, the material of which the part is made may be high molecular weight polyethylene, the punch diameter may be about 1¼ inch, the mold and plastic temperatures may be about 55 and 420 degrees F. respectively, and the punches may be moved forwardly after a delay of about 24 seconds after initiation of the blow molding process. The resulting slugs 642 will be left inside the article and may or may not become fused to the opposite inside wall depending on the time during the blow cycle and the temperature of the plastic material. The drain (exhaust) cycle is then started, and the punches are retracted. If a punch is also used for draining, it will not be retracted until after completion of the drain cycle. The mold is then opened and the molded part removed.

It should be understood that, while the present invention has been described in detail herein, the invention can be embodied otherwise without departing from the principles thereof. For example, the gate 36 and staircases 34 may be otherwise suitably shaped and sized and constructed by any other suitable process, and the means for attachment of the gate to the staircase described herein may be applied to other suitable structures. Such other embodiments are meant to come within the scope of the present invention as defined by the appended claims.

What is claimed is:

1. A gate comprising a body portion and at least one hinge molded integrally therewith;

wherein the body portion has a first edge portion to which the hinge is attached, a second edge portion opposite the first edge portion, and a protruding portion extending from the second edge portion which is receivable in at least one indent when the gate is in a closed position to support the gate in the closed position;

wherein the hinge includes a living hinge portion connecting first and second hinge halves that wrap around a hinge pin to allow the gate to rotate between a closed position and an open position; the hinge includes means to bias the gate in the closed position; and wherein the gate, the first and second hinge halves, and the living hinge are blow-molded.

2. The gate of claim 1 wherein said means to secure the gate in the closed position includes a helically-shaped lower surface on the hinge for mating with a helically-shaped upper bearing surface for effecting self-closing of the gate, wherein the helically-shaped surfaces are blow-molded.

* * * * *